US012773999B2

(12) United States Patent
Herrou et al.

(10) Patent No.: US 12,773,999 B2
(45) Date of Patent: Oct. 27, 2026

(54) DRIVER SCORING PLATFORM

(71) Applicant: Rivian IP Holdings, LLC, Plymouth, MI (US)

(72) Inventors: Philippe Herrou, Aptos, CA (US); Christopher R. Conklin, San Francisco, CA (US); Parker Richard Williams, Claremont, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 523 days.

(21) Appl. No.: 17/959,158

(22) Filed: Oct. 3, 2022

(65) Prior Publication Data

US 2024/0116515 A1 Apr. 11, 2024

(51) Int. Cl.
*B60W 40/09* (2012.01)
*B60W 40/12* (2012.01)
*B60W 50/00* (2006.01)

(52) U.S. Cl.
CPC ............ *B60W 40/09* (2013.01); *B60W 40/12* (2013.01); *B60W 50/0097* (2013.01); *B60W 2540/10* (2013.01); *B60W 2540/18* (2013.01)

(58) Field of Classification Search
CPC .. B60W 40/09; B60W 40/12; B60W 50/0097; B60W 2540/10; B60W 2540/18; B60W 2540/12; B60W 2556/45; G07C 5/008; G07C 5/08; G07C 5/0808; G01M 17/007; G01D 21/02; G06F 18/217; G06F 18/26; G06F 18/27
USPC .............................................................. 701/1
See application file for complete search history.

(56) References Cited

U.S. PATENT DOCUMENTS

2019/0383627 A1* 12/2019 Nangeroni ........ B60W 50/0098
2020/0013244 A1* 1/2020 Rosenbaum ........... G07C 5/008
2022/0194400 A1* 6/2022 Gee ........................ G06V 10/82

OTHER PUBLICATIONS

Dimitrios I. Tselentis, Eleonora Papadimitriou, Driver Profile and Driving Pattern Recognition for Road Safety Assessment: Main Challenges and Future Directions, European Union's Horizon 2020 research and innovation programme, Mar. 26, 2022 (Year: 2022).*
Luis F. Quirama,Michael Giraldo,Josè I. Huertas, Juan E. Tibaquira, Main characteristic parameters to describe driving patterns and construct driving cycles, Transportation Research Part D 97 (2021) 102959 (Year: 2021).*
Carfit. (Date Unknown). "Predicting maintenance needs by listening to your car", Revvo technologies.pdfLocated at: https://web.archive.org/web/20220326033937/https:/car.fit/en/ , Retrieved Oct. 7, 2022, 16 pages.
Revvo. "What is Revvo?", 2022 Revvo Technologies, Inc. located at: https://www.revvo.ai, retrieved Oct. 5, 2022, 18 pages.

* cited by examiner

*Primary Examiner* — Scott A Browne
*Assistant Examiner* — Nazia Afrin
(74) *Attorney, Agent, or Firm* — Baker & Hostetler LLP

(57) ABSTRACT

A method for correlating driving behavior to wear on a vehicle may include identifying a driver of the vehicle and receiving signals generated by a number of sensors built into specific locations on the vehicle. The method may include determining a driving pattern associated with the driver, assessing wear on the vehicle due to one or more wear mechanisms, identifying a correlation between the driving pattern and the assessed wear on the vehicle, and transmitting information associated with the correlation between the driving pattern and the assessed wear on the vehicle.

20 Claims, 8 Drawing Sheets

DRIVER SCORING PLATFORM

INTRODUCTION

Vehicle components may experience degradation or wear over time due to wear mechanisms such as vibration or friction. Different vehicle operators may cause different amounts of wear on a vehicle (e.g., based on different driving styles, etc.).

SUMMARY

Embodiments of the present disclosure are directed to vehicle control systems, methods, and computer readable mediums for assessing vehicle operators and generating recommendations to mitigate wear on a vehicle. The systems and methods of the present disclosure can monitor wear on a vehicle and correlate the wear to driving patterns of an operator to generate recommendations to adjust operator behavior, thereby reducing vehicle wear, vehicle downtime, and maintenance costs.

One implementation of the present disclosure is a method for correlating driving behavior to wear on a vehicle. In some embodiments, the method includes identifying, by a control module of the vehicle, a driver of the vehicle, and receiving, by the control module of the vehicle, signals generated by a plurality of sensors built into specific locations on the vehicle. In some embodiments, the sensors include at least one vibration sensor. In some embodiments, the method includes determining, by the control module of the vehicle based on the signals, a driving pattern associated with the driver, assessing, by the control module of the vehicle based on the signals, wear on the vehicle due to one or more wear mechanisms, identifying a correlation between the driving pattern and the assessed wear on the vehicle, and transmitting, by a telecommunications module of the vehicle to a vehicle data analysis system, information associated with the correlation between the driving pattern and the assessed wear on the vehicle.

In some embodiments, the signals include at least one of: (i) brake data describing a position of a brake of the vehicle, (ii) accelerator data describing a position of an accelerator of the vehicle, or (iii) steering data describing a steering angle of the vehicle. In some embodiments, determining the driving pattern includes generating a metric describing a driving characteristic of the driver. In some embodiments, the driving characteristic includes at least one of: (i) a stopping distance, (ii) a following distance, (iii) a position in lane, (iv) a ratio of actual speed to a threshold, (v) a frequency of lane changes, (vi) a frequency of rapid acceleration, or (vii) a frequency of rapid deceleration. In some embodiments, determining the driving pattern includes generating an objective function that represents a contribution of the driving characteristic to the assessed wear and comprises the metric. In some embodiments, identifying the correlation between the driving pattern and the assessed wear includes determining a contribution of the driving characteristic to the assessed wear.

In some embodiments, determining the contribution of the driving characteristic to the assessed wear includes determining a weight associated with the metric in an objective function that represents the contribution of the driving characteristic to the assessed wear. In some embodiments, transmitting the information associated with the correlation includes transmitting a report associated with the driving characteristic based on the contribution. In some embodiments, assessing wear on the vehicle includes at least one of (i) applying a machine learning (ML) model trained to predict component wear to at least a first portion of the signals, (ii) applying a transfer function to at least a second portion of the signals, or (iii) generating a frequency domain representation of at least a third portion of the signals.

Another implementation of the present disclosure is a vehicle system for correlating driving behavior to wear on a vehicle including a number of sensors built into specific locations on the vehicle, a display, and one or more computing devices. In some embodiments, the number of sensors include at least one vibration sensor. In some embodiments, the one or more computing devices include one or more non-transitory computer-readable storage media including instructions and one or more processors coupled to the one or more storage media. In some embodiments, the one or more processors are configured to execute the instructions to identify a driver of the vehicle, receive signals generated by the number of sensors, determine, based on the signals, a driving pattern associated with the driver, assess, based on the signals, wear on the vehicle due to one or more wear mechanisms, identify a correlation between the driving pattern and the assessed wear on the vehicle, and transmit, to a vehicle data analysis system, information associated with the correlation between the driving pattern and the assessed wear on the vehicle.

In some embodiments, the signals include at least one of: (i) brake data describing a position of a brake of the vehicle, (ii) accelerator data describing a position of an accelerator of the vehicle, or (iii) steering data describing a steering angle of the vehicle. In some embodiments, determining the driving pattern includes generating a metric describing a driving characteristic of the driver. In some embodiments, the driving characteristic includes at least one of: (i) a stopping distance, (ii) a following distance, (iii) a position in lane, (iv) a speed, (v) a frequency of lane changes, (vi) a frequency of rapid acceleration, or (vii) a frequency of rapid deceleration. In some embodiments, determining the driving pattern includes generating an objective function that represents a contribution of the driving characteristic to the assessed wear and includes the metric. In some embodiments, identifying the correlation between the driving pattern and the assessed wear includes determining a contribution of the driving characteristic to the assessed wear.

In some embodiments, determining the contribution of the driving characteristic to the assessed wear includes determining a weight associated with the metric in an objective function that represents the contribution of the driving characteristic to the assessed wear. In some embodiments, transmitting the information associated with the correlation includes transmitting a report associated with the driving characteristic based on the contribution. In some embodiments, assessing wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals.

Another implementation of the present disclosure is a non-transitory computer-readable medium including instructions. In some embodiments, when executed by one or more processors of one or more computing devices, the instructions cause the one or more processors to identify a driver of the vehicle, receive signals generated by a number of sensors built into specific locations on the vehicle. In some embodiments, the sensors include at least one vibration sensor. In some embodiments, the instructions cause the one or more processors to determine, based on the signals, a driving pattern associated with the driver, assess, based on the signals, wear on the vehicle due to one or more wear mechanisms, identify a correlation between the driving pattern and the assessed wear on the vehicle, and transmit, to a vehicle data analysis system, information associated with the correlation between the driving pattern and the assessed wear on the vehicle.

In some embodiments, transmitting the information includes transmitting a ranking associated with the driver, the ranking describing a driving characteristic of the driver in comparison with driving characteristics of other drivers.

Another implementation of the present disclosure is a method for correlating driving behavior to wear on a vehicle. In some embodiments, the method includes receiving, by one or more servers associated with a vehicle data analysis system, information related to signals generated by a number of sensors built into specific locations on a vehicle. In some embodiments, the sensors include at least one vibration sensor. In some embodiments, the method includes determining, by the one or more servers based on the signals, a driving pattern associated with the driver, assessing, by the one or more servers based on the signals, wear on the vehicle due to one or more wear mechanisms, identifying, by the one or more servers, a correlation between the driving pattern and the assessed wear on the vehicle, and computing, by the one or more servers, a score associated with the driver. In some embodiments, the score is based on a comparison between (1) the correlation between the driving pattern associated with the driver and the assessed wear on the vehicle and (2) a correlation between driving patterns associated with other drivers and assessed wear on their respective vehicles.

In some embodiments, the information related to the signals includes at least one of: (i) brake data describing a position of a brake of the vehicle, (ii) accelerator data describing a position of an accelerator of the vehicle, or (iii) steering data describing a steering angle of the vehicle. In some embodiments, determining the driving pattern includes generating, by the one or more servers, a metric describing a driving characteristic of the driver. In some embodiments, identifying the correlation between the driving pattern and the assessed wear includes determining a contribution of the driving characteristic to the assessed wear. In some embodiments, determining the contribution of the driving characteristic to the assessed wear includes determining a weight associated with the metric in an objective function that represents the contribution of the driving characteristic to the assessed wear. In some embodiments, computing the score includes evaluating the objective function.

In some embodiments, identifying the correlation between the driving pattern and the assessed wear includes identifying, by the one or more servers, an increased rate of wear associated with the vehicle and determining, by the one or more servers, a cause of the increased rate of wear. In some embodiments, the method includes ranking, by the one or more servers, the driver and the other drivers based on the score associated with the driver. In some embodiments, assessing wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals.

Another implementation of the present disclosure is a vehicle system including one or more computing devices. In some embodiments, the one or more computing devices include one or more non-transitory computer-readable storage media including instructions and one or more processors coupled to the one or more storage media. In some embodiments, the one or more processors are configured to execute the instructions to receive information related to signals generated by a number of sensors built into specific locations on a vehicle. In some embodiments, the sensors include at least one vibration sensor. In some embodiments, the one or more processors are configured to execute the instructions to determine, based on the signals, a driving pattern associated with the driver, assess, based on the signals, wear on the vehicle due to one or more wear mechanisms, identify a correlation between the driving pattern and the assessed wear on the vehicle, and compute a score associated with the driver. In some embodiments, the score is based on a comparison between (1) the correlation between the driving pattern associated with the driver and the assessed wear on the vehicle and (2) a correlation between driving patterns associated with other drivers and assessed wear on their respective vehicles.

In some embodiments, the information related to the signals include at least one of: (i) brake data describing a position of a brake of the vehicle, (ii) accelerator data describing a position of an accelerator of the vehicle, or (iii) steering data describing a steering angle of the vehicle. In some embodiments, determining the driving pattern includes generating a metric describing a driving characteristic of the driver. In some embodiments, identifying the correlation between the driving pattern and the assessed wear includes determining a contribution of the driving characteristic to the assessed wear. In some embodiments, determining the contribution of the driving characteristic to the assessed wear includes determining a weight associated with the metric in an objective function that represents the contribution of the driving characteristic to the assessed wear.

In some embodiments, computing the score includes evaluating the objective function. In some embodiments, identifying the correlation between the driving pattern and the assessed wear includes identifying an increased rate of wear associated with the vehicle, and determining a cause of the increased rate of wear. In some embodiments, the one or more processors are configured to rank the driver and the other drivers based on the score associated with the driver. In some embodiments, assessing wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals.

Another implementation of the present disclosure is a non-transitory computer-readable medium including instructions. In some embodiments, when executed by one or more processors of one or more computing devices, the instructions cause the one or more processors to receive information related to signals generated by a number of sensors built into specific locations on a vehicle. In some embodiments, the sensors include at least one vibration sensor. In some embodiments, the instructions cause the one or more processors to determine, based on the signals, a driving pattern associated with the driver, assess, based on the signals, wear on the vehicle due to one or more wear mechanisms, identify a correlation between the driving pattern and the assessed wear on the vehicle, and compute a score associated with the driver. In some embodiments, the score is based on a comparison between (1) the correlation between the driving pattern associated with the driver and the assessed wear on the vehicle and (2) a correlation between driving patterns associated with other drivers and assessed wear on their respective vehicles.

In some embodiments, identifying the correlation between the driving pattern and the assessed wear includes determining a contribution of a driving characteristic of the driving pattern to the assessed wear. In some embodiments, the driving characteristic includes at least one of: (i) a stopping distance, (ii) a following distance, (iii) a position in lane, (iv) a speed, (v) a frequency of lane changes, (vi) a frequency of rapid acceleration, or (vii) a frequency of rapid deceleration.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
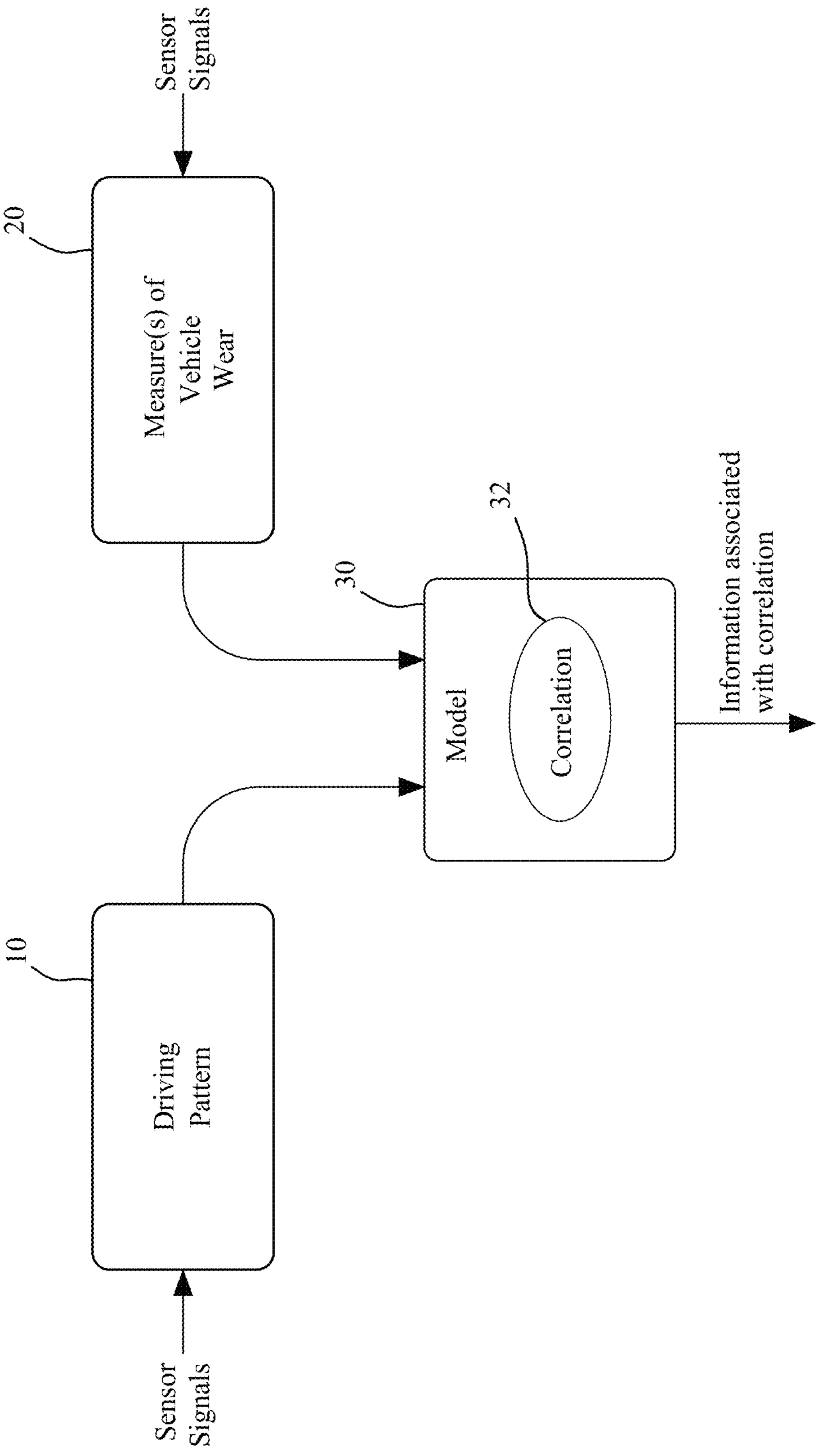
FIG. 1 illustrates an example of determining a correlation between a driving pattern and vehicle wear.

Embodiments of the present disclosure are directed towards vehicle control systems, methods, and computer readable mediums for correlating driving behavior to wear on a vehicle. Specifically, systems and methods of the present disclosure enable continuous monitoring of driver behavior (e.g., how closely a driver follows behind other vehicles, how smoothly the driver steers, how aggressively the driver brakes, how often the driver exceeds a speed limit, etc.) to determine an impact of the driver behavior on various outcomes (e.g., accelerated vehicle/vehicle component wear, unplanned downtime/maintenance, accidents, etc.) and to generate recommendations related to the various outcomes. In various embodiments, vehicles are fitted with sensors that measure a driving pattern of a driver. For example, a vehicle may continuously record a throttle/brake position, a steering wheel position, a distance between the vehicle and surrounding objects (e.g., other vehicles the vehicle is following, etc.), and/or a position of the vehicle (e.g., a position within a lane of a road, etc.) and may combine the various measurements into a driving pattern that is linked to a specific driver. The driving pattern may be correlated with outcomes such as accelerated vehicle/vehicle component wear, unplanned downtime, and/or accidents (e.g., vehicle collisions, etc.) to determine an impact of a driver's actions in causing the outcome. For example, systems and methods of the present disclosure may determine that a user's tendency to exceed the speed limit by an average of 10 miles per hour (MPH) is causing accelerated wear (e.g., wear accumulation at a rate greater than expected given the road surface characteristics, etc.) on a component of a vehicle.

In various embodiments, vehicles are fitted with a number of high-bandwidth tri-axial accelerometers to facilitate monitoring for mechanical wear. The information from the accelerometers may be integrated with other signals generated by the vehicle inside a module on board the vehicle to allow for real-time, synchronous processing to provide an indication of an amount of wear experienced by the vehicle. The indication of the amount of wear experienced by the vehicle may be correlated with a driving pattern to generate recommendations for adjusting the driver's behavior (e.g., driving more slowly, allowing more distance between the driver and a vehicle the driver is following, etc.) to reduce an accumulation of wear on the vehicle. For example, a fleet management system may generate a recommendation for a driver to drive more slowly to reduce vibration-based wear on a delivery vehicle.

Speaking now generally, the platform may collect a number of signals from sensors embedded in a vehicle. In some embodiments, an on-board module receives the signals. Additionally or alternatively, a cloud-based data processing system (e.g., a vehicle data analysis system, etc.) may receive the signals. For example, the on-board module may receive a first set of signals and perform a first type of analysis (e.g., physics-based analysis, etc.) on the first set of signals and a cloud-based data processing system may receive a second set of signals and perform a second type of analysis (e.g., AI-based analysis, etc.) on the second set of signals. The signals may be associated with a health of the vehicle/vehicle components (e.g., vibration data, microphone data, data describing torque applied to a component of the vehicle, etc.), a user's operation of the vehicle (e.g., steering angle data, throttle/brake pedal apply data, wheel speed data, drive unit speed/torque data, etc.), and/or an environmental context of the vehicle (e.g., ambient temperature data, data describing a following distance of the vehicle, data describing characteristics of a road surface the vehicle is traveling on, etc.). The signals may include a throttle position, a measure of stopping distance, a measure of hard cornering, a measure of rapid steering, a relative position (e.g., a position in lane, a following distance, etc.), a measure of interactions with surface characteristics (e.g., pothole strikes, etc.), a measure of torsion into a frame of the vehicle, and/or a measure of speed.

In various embodiments, the on-board module and/or the cloud-based data processing system analyze the signals using a model to generate a number of outputs. The model may include a machine learning (ML) model such as a regression model. In some embodiments, the model includes a linear model. Additionally or alternatively, the model may include a non-linear model. The model may receive the signals as inputs and may determine a correlation between the inputs and one or more outcomes such as accelerated vehicle/vehicle component wear, unplanned downtime, and/or an accident. In various embodiments, correlating the inputs with the one or more outcomes includes determining weights for one or more parameters of an objective function. For example, an objective function may be used to generate a score for each driver describing an impact of the driver's driving pattern on vehicle wear and the cloud-based data processing system may correlate aspects of the driver's driving pattern with an outcome such as unplanned downtime (e.g., due to a mechanical component failure, etc.). As another example, the cloud-based data processing system may correlate a frequency of hard cornering events performed by the driver with accelerated tire wear. In various embodiments, the model outputs the objective function weights and/or a score for each driver. The platform may use the score to rank drivers and a driver's ranking may be used to perform additional analysis. For example, a driver's score/ranking may be used as an input to a model to determine an insurance premium for the driver.

In various embodiments, the on-board module and/or the cloud-based data processing system train a model to generate the driver score and/or the weights describing an impact of specific driving characteristics on the driver score using feedback. For example, the cloud-based data processing system may train a convolutional neural network (CNN) autoencoder using historical timeseries vibration data (e.g., indicating vibrations experienced by a vehicle/vehicle component as a result of traversing a road surface) and historical service data (e.g., indicating what wear the vehicle/vehicle components experienced, etc.) that is labeled to identify specific driving events (e.g., hard cornering events, pothole strikes, rapid steering events, etc.) to identify patterns in vibration data that are correlated with the specific driving events. As another example, the cloud-based data processing system may train a non-linear regression model using labeled timeseries data from a vehicle indicating driving events (e.g., hard cornering events, pothole strikes, rapid steering events, etc.) and historical service data to identify a correlation between the driving events and wear/unplanned downtime associated with a vehicle. The on-board module and/or the cloud-based data processing system may apply different models to produce different outputs. For example, a neural network may be used to label driving events in vibration data and a regression model may be used to determine a correlation between driving events and unplanned downtime.

In some embodiments, the on-board module and/or the cloud-based data processing system identify a driving pattern for each driver. The driving pattern may describe various characteristics of a driver's behavior such as how often they exceed a speed limit, how closely they follow other cars, how often they drift out of lane, and/or the like. The driving pattern may be represented as a matrix including a number of individual driver characteristics/metrics. For example, a driving pattern may include metrics describing (i) an average following distance of a driver, (ii) how often the driver has a hard braking event, (iii) the average amount of torsion the driver produces on a frame of the vehicle during turns, and (iv) how often the driver drifts out of lane. In some embodiments, the driving pattern is represented as an objective function having a number of weighted parameters, each parameter corresponding to a driver characteristic/metric.

Correlating driver behavior (e.g., a driving pattern of a driver, etc.) with outcomes such as accelerated wear may include generating a measure of wear associated with a vehicle/vehicle component. For example, the on-board module may analyze vibration data and/or microphone data to generate one or more health metrics associated with the vehicle and/or vehicle components. In various embodiments, the health metrics include a measurement of wear such as vibration-based wear and/or strain-based wear. For example, the on-board module may apply a transfer function to vibration data to determine strain at a component and may compute an accrued rainflow matrix using the strain at the component to generate a measurement of strain-based wear for the component. In various embodiments, the on-board module and/or the cloud-based data processing system update a data structure (e.g., stored in a database, etc.) with the one or more health metrics. For example, the on-board module may compute strain-based wear associated with a component of a vehicle accumulated over a 24-hour period and may update a database entry associated with the vehicle to include the accumulated strain-based wear. The database may store various metrics associated with a vehicle, a fleet of vehicles, and/or the like. For example, the database may include a ledger listing a number of components associated with a vehicle and a measurement of wear associated with each of the components.

The on-board module and/or the cloud-based data processing system may transmit outputs from the model(s) (e.g., a driver score, weights associated with parameters corresponding to driver characteristics/metrics, etc.) for additional analysis. For example, the cloud-based data processing system may transmit a driver score to a fleet management system to enable a fleet manager to determine which delivery drivers require additional training. As another example, the cloud-based data processing system may transmit a driver ranking to an insurance provider computing system for use in a model to determine an insurance premium for the driver.

In various embodiments, the platform (e.g., the cloud-based data processing system and/or the on-board module, etc.) proactively generates recommendations based on correlating a driving pattern with an outcome (e.g., accelerated vehicle/vehicle component wear, unplanned downtime, an accident, etc.). For example, the platform may correlate a user's driving pattern with trends in component wear to generate suggestions for the user on how to adjust their driving to reduce further wear on the vehicle. As another example, the platform may correlate a user's driving pattern with an accident to generate a suggestion for avoiding the accident in the future.

Turning now to FIG. 1, an example of determining a correlation between a driving pattern and vehicle wear is shown, according to an exemplary embodiment. In brief summary, the platform (e.g., an on-board module and/or a cloud-based data processing system, etc.) may generate driving pattern 10 and measure(s) of vehicle wear 20. The platform may input driving pattern 10 and measure(s) of vehicle wear 20 into model 30 to determine correlation 32. Model 30 may output information associated with correlation 32 such as a driver score describing an impact of a driver's actions on accelerated vehicle wear.

In various embodiments, the on-board module and/or the cloud-based data processing system generate driving pattern 10 based on sensor signals. For example, the cloud-based data processing system may receive sensor signals describing a throttle/brake position, a steering angle, a relative position of the vehicle (e.g., in relation to other vehicles, in relation to a lane the vehicle is traveling in, etc.), and force acting on the vehicle (e.g., a roll moment of the vehicle, torsion applied to a frame of the vehicle due to traversing a rough surface, etc.) and may generate a number of driver characteristics/metrics based on the sensor signals. The driver characteristics/metrics may include metrics describing how rapidly a driver accelerates, the average stopping distance of the driver, a frequency of lane drift, an average following distance of the driver, and/or other metrics describing how a driver operates a vehicle. The on-board module and/or the cloud-based data processing system may calculate one or more statistical measures based on the sensor signals to generate the driver characteristics/metrics. For example, the on-board module may retrieve timeseries brake position data and accelerometer data (e.g., describing an amount of braking force experienced by a driver during braking, etc.), may identify hard braking events (e.g., events where braking/braking force exceeded a threshold, etc.), may label the data to identify the hard braking events, and may calculate a ratio of normal braking events (e.g., events where braking/braking force did not exceed a threshold, etc.) to hard braking events based on the labeled data.

In various embodiments, driving pattern 10 includes a number of driver characteristics/metrics. For example, a driving pattern 10 for a specific driver may include a measure of a frequency of hard cornering events (e.g., one hard cornering event for every 120 miles driven, three hard cornering events for every 70 corners of at least 90° taken, etc.), a measure of average following distance (e.g., when within 100 feet behind another vehicle and traveling at least 20 MPH a driver leaves a gap of 30 feet on average, etc.), and a ratio of driving time that exceeds a speed limit (e.g., a driver exceeds the relevant speed limit 10% of the time they are driving over 20 MPH, etc.). In various embodiments, each driver is assigned a driving pattern 10. Each driving pattern 10 may include the same combination of driver characteristics/metrics. Additionally or alternatively, different driving patterns 10 may include different driver characteristics/metrics. For example, the cloud-based data processing system may generate a first driving pattern for a first type of driver (e.g., a long-haul trucker, etc.) including a first set of driver characteristics/metrics and may generate a second driving pattern for a second type of driver (e.g., an ambulance driver, etc.) including a second set of driver characteristic/metrics.

In various embodiments, the on-board module and/or the cloud-based data processing system generate measure(s) of vehicle wear 20 based on sensor signals. For example, the on-board module may receive vibration data from a number of on-board tri-axial accelerometers, may apply a transfer function to the vibration data to generate a measure of stress associated with a vehicle component, and may compute a rainflow matrix using the measure of stress to generate a measure of stress-based wear associated with the component. In some embodiments, measure(s) of vehicle wear 20 include one or more measures of vehicle wear associated with components of a vehicle. For example, measure(s) of vehicle wear 20 may include a measure of drive unit bearing wear, a measure of rear-right tire wear, and a measure of AC compressor wear. Additionally or alternatively, measure(s) of vehicle wear 20 may include an aggregate measure of vehicle wear. For example, the on-board module may compute an average of a number of component-level wear measures to determine an aggregate measure of vehicle wear. Calculating wear is described in greater detail with reference to FIGS. 2-5 below.

Model 30 may be a ML model. For example, model 30 may include a non-linear regression model. As another example, model 30 may include a linear regression model. In various embodiments, model 30 includes a number of models. For example, model 30 may include a first model for correlating specific driver characteristics/metrics with accelerated wear, a second model for correlating specific driver characteristics with unplanned downtime, and a third model for generating a driver score. Additionally or alternatively, the number of models may be combined into a single model. In various embodiments, model 30 generates a score for each driver based on driving pattern 10 and measure(s) of vehicle wear 20. For example, model 30 may compare (i) a correlation between a driving pattern associated with a driver and a measure of aggregate wear associated with a vehicle operated by the driver and (ii) a correlation between driving patterns associated with other drivers and measures of aggregate wear associated with their respective vehicles. In various embodiments, model 30 includes an objective function. For example, model 30 may output a driver score for each driver using an objective function including a number of weighted parameters each corresponding to a contribution of a driver characteristic/metric to the driver score. In some embodiments, the driver score represents a driver's contribution to vehicle wear (e.g., aggregate vehicle wear, tire wear, drive unit bearing wear, etc.).

Model 30 may generate correlation 32. Correlation 32 may describe a relationship between a first metric (e.g., an average roll moment experienced by a vehicle as a user takes a corner, etc.) and a second metric (e.g., an accumulation of wear on a component of a vehicle, etc.). In various embodiments, module 30 generates a number of correlations 32. For example, model 30 may generate a first correlation between a driving pattern for a specific driver and wear on a vehicle operated by the specific driver and may generate a second correlation between driving patterns associated with a number of drivers and measures of aggregate wear associated with vehicles operated by the number of drivers. In various embodiments, model 30 generates one or more correlation coefficients (e.g., a Pearson's correlation coefficient, etc.) based on correlation 32.

In various embodiments, model 30 is trained using training data. For example, the cloud-based data processing system may train model 30 using historical service data and historical sensor signals (e.g., vibration data, image data, sound data, data describing a user's operation of a vehicle, etc.) collected during operation of a fleet of vehicles. The training data may include timeseries data describing a driver's operation of a vehicle (e.g., a speed of the vehicle, a throttle/brake position of the vehicle, a torque produced by a drive unit of the vehicle, etc.) that is labeled to identify driver behavior patterns (e.g., hard cornering events, speeding events, rapid steering events, hard braking events, etc.). Additionally or alternatively, the training data may include data describing vehicle/vehicle component wear (e.g., vibration data from a number of tri-axial accelerometers disposed on the vehicle, image data of a tire tread of a tire of the vehicle, feedback from technicians conducting service on components of the vehicle, etc.). Model 30 may be trained using a feedback process. For example, the cloud-based data processing system may continuously update model 30 using measures of vehicle wear calculated from vibration data received from a fleet of vehicles. In various embodiments, model 30 is trained using a number of datasets. For example, the cloud-based data processing system may initially train model 30 using feedback from technicians conducting service on components of a vehicle and then may continuously update model 30 using wear measurements generated from vibration data collected from a fleet of vehicles during operation.

The on-board module and/or the cloud-based data processing system may generate one or more outputs from model 30 based on correlation 32. For example, the cloud-based data processing system may generate a number of coefficients associated with parameters of an objective function that produces a driver score. The outputs may include a driver score describing a driver's contribution to vehicle/vehicle component wear. Additionally or alternatively, the outputs may include a ranking based on the driver score. For example, the cloud-based data processing system may rank a number of drivers in a fleet based on their respective driver scores to determine which drivers cause the most vehicle wear and which drivers cause the least vehicle wear.

In various embodiments, the outputs of model 30 are used to perform additional analysis. For example, the cloud-based data processing system may transmit a driver ranking to an insurance provider computing system to facilitate determining an insurance premium for the driver. As another example, the cloud-based data processing system may transmit a driver score to a fleet management system to enable a fleet manager to determine which drivers need additional training (e.g., because their driver scores indicate that they are producing an unusually high amount of vehicle wear, etc.). In some embodiments, the on-board module and/or the cloud-based data processing system generate recommendations based on information associated with correlation 32. For example, the cloud-based data processing system may identify a coefficient from an objective function that is indicative of a specific driver characteristic/metric causing accelerated tire wear and may generate a recommendation for a driver to adjust an operation of the vehicle to change the specific driver characteristic/metric to reduce a rate of future tire wear.

Figure 2:
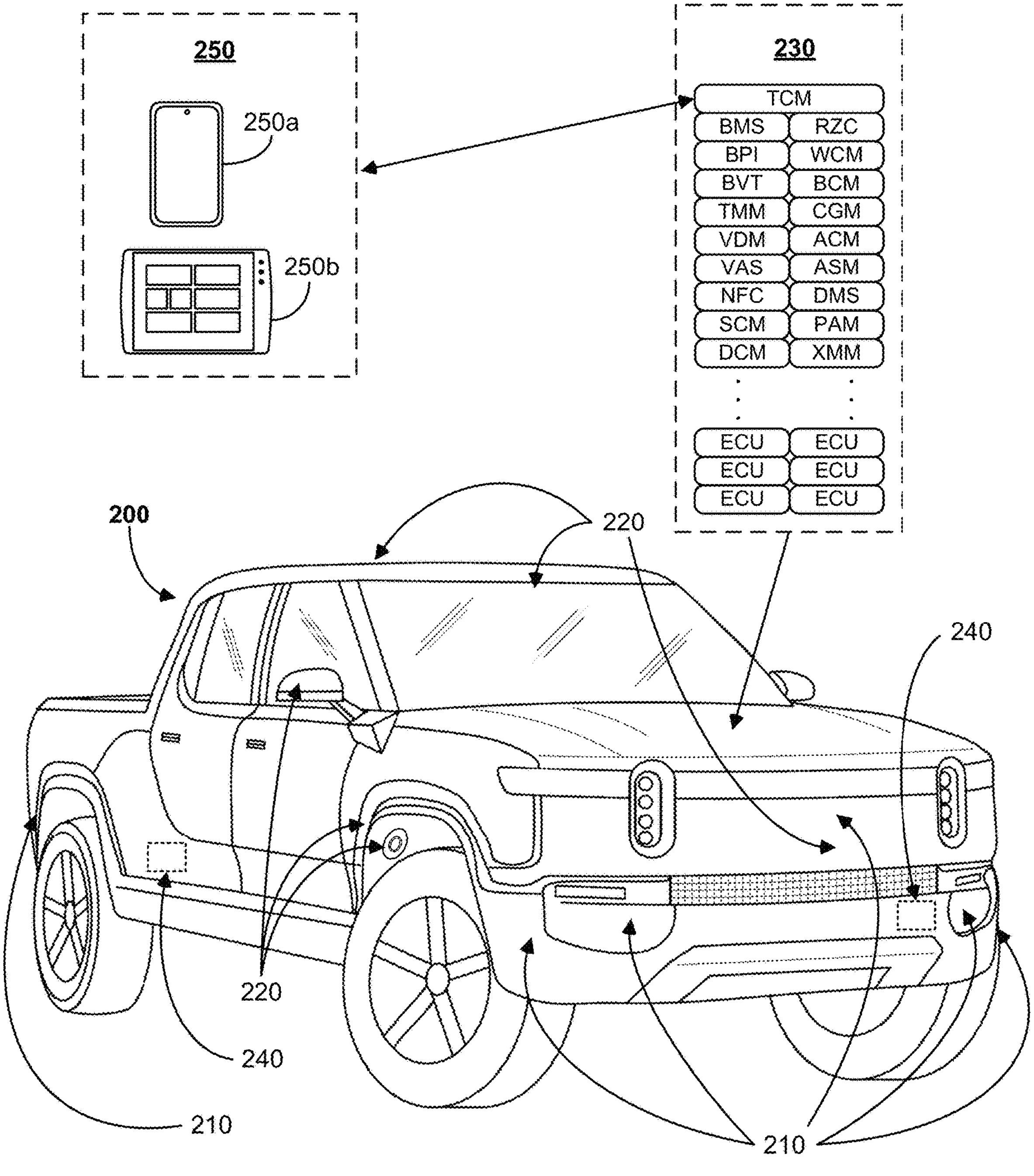
FIG. 2 illustrates an example vehicle with example sensors for measuring vehicle wear.

FIG. 2 illustrates an example vehicle 200 with example sensors for measuring vehicle wear. Vehicle 200 may include multiple sensors 210, multiple cameras 220, and a control system 230. In some embodiments, vehicle 200 may be able to pair with a computing device 250 (e.g., smartphone 250*a*, tablet computing device 250*b*, or a smart vehicle accessory). As an example and not by way of limitation, a sensor 210 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. For example, sensors 210 may include a GPS sensor, a microphone, a steering angle sensor, an ambient temperature sensor, an environmental condition sensor (e.g., detecting rain, snow, fog, etc.), a throttle sensor, a brake pedal apply sensor, an inertial measurement sensor, an accelerometer, a wheel speed sensor, and/or a drive unit speed/torque sensor.

In various embodiments, vehicle 200 includes vibration sensors 240. Vibration sensors 240 may be accelerometers connected to a high bandwidth, bidirectional, digital audio bus on an in-vehicle module. A specific example may be to connect vibration sensors 240 to an A2B-2 bus on the module used for infotainment display and audio. The in-vehicle module may transmit the accelerometer data via a wired connection to a second in-vehicle module which in turn transmits wirelessly to the cloud. Using the previous example, the infotainment module may transmit the accelerometer data via Ethernet to a telematics control module that controls the wireless vehicle communication gateway and over-the-air (OTA) communication between the vehicle and a corresponding cloud. Once the telematics module receives the accelerometer data, it may send that data wirelessly to the cloud.

In various embodiments, vibration sensors 240 are placed in specific portions of vehicle 200. For example, vibration sensors 240 may be placed on the front of vehicle 200 in order to generate an estimate of the accumulated wear on the front component of vehicle 200 and to determine if a crack may be present on the component. In various embodiments, vibration sensors 240 may be added to the front drive unit in order to mitigate reliability concerns. A number of techniques may be applied to the signal data from vibration sensors 240 to estimate the vibrations that are accumulating on the vehicle components (e.g., tires, struts, drive unit gears, etc.). The estimate of accumulated vibrations may indicate wear on the vehicle components and may correlate with vehicle health and the need for maintenance. In various embodiments, vibration sensors 240 are positioned in a first location on vehicle 200 and are used to measure vibrations associated with a component at a second location on vehicle 200 remote from the first location. For example, a vibration sensor 240 may be positioned on a component of vehicle 200 and may generate a measurement of vibrations at a wheel of vehicle 200 using a transfer function. Analysis of signal data is described in greater detail below.

As an example and not by way of limitation, a camera 220 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 200 may include various controllable components (e.g., doors, seats, windows, lights, HVAC, entertainment system, security system), instrument and information displays and/or interactive interfaces, functionality to pair a computing device 250 with the vehicle (which may enable control of certain vehicle functions using the computing device 250), and functionality to pair accessories with the vehicle, which may then be controllable through an interactive interface in the vehicle or through a paired computing device 250. In some embodiments, vehicle 200 includes one or more cameras 220 positioned in a wheel-well of vehicle 200. For example, vehicle 200 may include a number of cameras positioned in a wheel-well to monitor a tire of vehicle 200 to generate an estimate of tire wear (e.g., determine a tread depth from image data, etc.).

Control system 230 may enable control of various systems on-board the vehicle. As shown in FIG. 2, control system 230 may comprise one or more electronic control units (ECUs), each of which are dedicated to a specific set of functions. Each ECU may be a computer system (as described further in FIGS. 13A and 13B), and each ECU may include functionality provide by one or more of the example ECUs described below.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 250, in-vehicle navigation, vehicle-to-vehicle communication, communication between the vehicle and landscape features (e.g., automated toll road sensors, automated toll gates, power dispensers at charging stations), or automated calling functionality. In various embodiments, the TCM ECU transmits information associated with a health of vehicle 200 and/or components of vehicle 200. For example, the TCM ECU may transmit raw sensor data from vibrations sensors 240 to a cloud processing system such as the vehicle data analysis system described with reference to FIG. 1. As another example, the TCM ECU may transmit a measurement of temporal wear (e.g., a number of fatigue cycles accumulated over 15 minutes of operation, etc.) associated with a vehicle component to a vehicle data analysis system. In some embodiments, the TCM ECU transmits additional information associated with operation of vehicle 200. For example, the TCM ECU may transmit a location associated with a road characteristic identified by vehicle 200. As another example, the TCM ECU may transmit one or more driving characteristics (e.g., average following distance, percentage of time over the speed limit, etc.) associated with a driving pattern of a user of vehicle 200. In various embodiments, the TCM ECU computes additional information such as component wear based on received signals from sensors such as sensors 210 and/or vibration sensors 240. For example, the TCM ECU may include a diagnostics feature to compute wear associated with a vehicle component using a rainflow matrix.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s). In various embodiments, the CGM ECU collects sensor signals from one or more sensors of vehicle 200. For example, the CGM ECU may collect vibration signals from vibration sensors 240 for transmittal to a remote processing system via the TCM ECU. As another example, the CGM ECU may collect information about a road surface vehicle 200 travels on. For example, the CGM ECU may collect vibration signals associated with traversing a route and may associate location data (e.g., a GPS position, etc.) with the vibration signals. In various embodiments, the CGM ECU collects signals associated with a user's operation of vehicle 200. For example, the CGM ECU may record any hard braking events, the following distance of vehicle 200 behind other vehicles, measurements of torque on a component of vehicle 200 based on hard-cornering events, and/or the like.

Vehicle 200 may include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 200 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data from vibration sensors 240 to the TCM ECU (e.g., via Ethernet, etc.). Additionally or alternatively, the XMM ECU may transmit other data (e.g., sound data from a number of microphones, etc.) to the TCM ECU.

Figure 3:
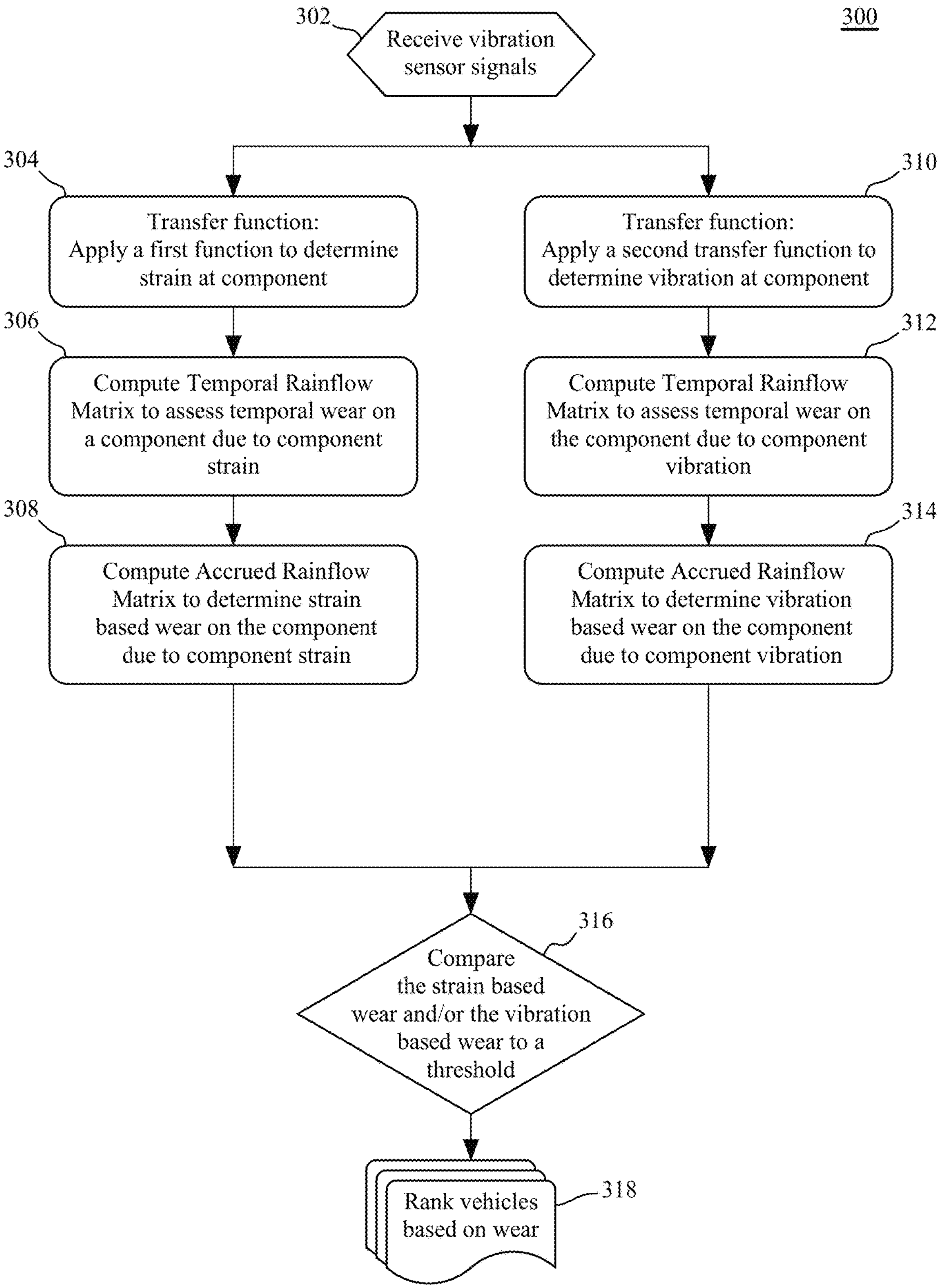
FIG. 3 is a flowchart illustrating a method of computing wear for a vehicle and ranking a number of vehicles based on wear.

Referring now to FIG. 3, a flowchart illustrating method 300 of computing wear for a vehicle and ranking a number of vehicles based on wear is shown, according to an exemplary embodiment. In various embodiments, vehicle 200 performs one or more steps of method 300. Additionally or alternatively, one or more external systems, such as a cloud-based data processing system, may perform one or more steps of method 300. For example, vehicle 200 may compute (e.g., via the TCM ECU of control system 230, etc.) wear associated with vehicle 200 and a vehicle data analysis system may rank a number of vehicles based on the computed wear associated with each vehicle.

The strain-based wear and vibration-based wear accumulating on the component may be computed separately but in parallel. In both cases, a transfer function may be applied first to the incoming vibration sensor signals. A temporal rainflow matrix may be integrated into a constantly updating accrual rainflow matrix which is used to compute the final wear amounts. The wear may be compared against a threshold and a component having accumulated wear that exceeds the acceptable threshold may be identified for servicing.

At step 302, control system 230 may receive vibration sensor signals. For example, control system 230 may receive vibration sensor signals from vibration sensors 240 positioned on specific portions of vehicle 200. In various embodiments, the vibration sensor signals include timeseries data. At step 304, control system 230 may apply a first transfer function to determine strain at a component of vehicle 200. For example, control system 230 may retrieve a transfer function corresponding to a specific vibration sensor 240 and component pair from a lookup table and may apply the transfer function to signals from the specific vibration sensor 240 to determine strain at the component.

Speaking generally, control system 230 may utilize one or more transfer functions that model a characteristic of vehicle 200 at a second location based on a characteristic of vehicle 200 at a first location. For example, control system 230 may utilize a first transfer function that models force on a portion of a component of vehicle 200 based on a measurement of vibrations at a wheel of vehicle 200. As another example, control system 230 may utilize a second transfer function that models vibration at a wheel strut based on a measurement of vibrations at a component of vehicle 200. In various embodiments, the one or more transfer functions are determined based on operational measurements (e.g., measurements describing a relationship between vibration and strain, etc.).

In various embodiments, determining strain includes computing a measurement of vibration at the component based on the vibration sensor signals. Additionally or alternatively, determining strain may include computing a measurement of force at the component based on the vibration sensor signals. For example, control system 230 may compute a measurement of vibration at a location on a component of vehicle 200 by applying a first transfer function to sensor signals from a vibration sensor positioned on a wheel of vehicle 200 and may compute a measurement of force at the location on the component by applying a second transfer function to the measurement of vibration at the location.

At step 306, control system 230 may compute a temporal rainflow matrix to assess temporal wear on a component due to component strain. For example, control system 230 may compute a number of fatigue cycles associated with a spring damper based on timeseries data describing force on the spring damper. In various embodiments, the temporal rainflow matrix is associated with a time period. For example, the temporal rainflow matrix may represent an accumulation of fatigue cycles associated with a component over a 24-hour period. It should be understood that a different period may be used (e.g., 15 seconds, 1 hour, whenever connected to the Internet, etc.). In various embodiments, the temporal rainflow matrix is an assembly of a number of fatigue cycles, an amplitude associated with the fatigue cycles, and/or a frequency of the fatigue cycles.

At step 308, control system 230 may compute an accrued rainflow matrix to determine strain-based wear on the component due to component strain. For example, control system 230 may compute an accrued number of fatigue cycles associated with a component of vehicle 200 over a lifetime of the component. In some embodiments, step 308 includes querying an external system, such as a vehicle data analysis system, to retrieve a first measurement of fatigue cycles associated with a first time period and adding a second measurement of fatigue cycles associated with a second time period to determine the strain-based wear. Additionally or alternatively, vehicle 200 may store a running count of fatigue cycles associated with one or more components. In various embodiments, the strain-based wear includes an aggregate number of fatigue cycles and an amplitude associated with the fatigue cycles corresponding to the component. In some embodiments, control system 230 compares the aggregate number of fatigue cycles and the amplitude associated with the fatigue cycles to a value associated with component failure to determine a percentage of lifetime remaining associated with the component. In some embodiments, the value associated with component failure is determined experimentally (e.g., via coupon testing, etc.).

At step 310, control system 230 may apply a second transfer function to determine vibrations at the component. For example, control system 230 may retrieve a transfer function corresponding to a specific vibration sensor 240 and component pair from a lookup table and may apply the transfer function to signals from the specific vibration sensor 240 to determine vibrations at the component. At step 312, control system 230 may compute a temporal rainflow matrix to assess temporal wear on the component due to component vibration. For example, control system 230 may compute a number of fatigue cycles associated with the component and an amplitude of the fatigue cycles based on the vibration at the component.

At step 314, control system 230 may compute an accrued rainflow matrix to determine vibration-based wear on the component due to component vibration. For example, control system 230 may sum a number of fatigue cycles associated with a component that were accumulated over a 24-hour period with a number of fatigue cycles associated with the component accumulated before the 24-hour period. In embodiments where vehicle 200 is an electric vehicle, step 316 may occur in response to control system 230 sensing that vehicle 200 has been connected to a charger. In some embodiments, control system 230 compares the aggregate number of fatigue cycles and the amplitude associated with the fatigue cycles to a value associated with component failure to determine a percentage of lifetime remaining associated with the component.

At step 316, control system 230 may compare the strain-based wear to a threshold. For example, control system 230 may compare an aggregate number of fatigue cycles associated with the component over the lifetime of the component to a threshold to determine whether the aggregate number of fatigue cycles exceed the threshold. Additionally or alternatively, control system 230 may compare the vibration-based wear to a threshold. In various embodiments, control system 230 uses a first threshold for comparing strain-based wear and a second threshold for comparing vibration-based wear. In various embodiments, if the vibration-based wear and/or strain-based wear exceeds the threshold, control system 230 generates an alert. The alert may trigger additional actions such as automatically scheduling a service appointment to service the component. In some embodiments, the first and second thresholds are determined experimentally (e.g., via coupon testing, etc.). Additionally or alternatively, the first and second thresholds may be determined using an AI model trained with historical service data.

At step 318, a vehicle data analysis system (e.g., a cloud-based data processing system, etc.) may rank vehicles based on wear. For example, the vehicle data analysis system may query a ledger containing one or more vehicle health metrics associated with a fleet of vehicles and may rank the vehicles in the fleet from most wear to least wear. In some embodiments, step 318 includes aggregating one or more wear metrics associated with a number of components of a vehicle into a single wear metric representing the overall vehicle. For example, a vehicle data analysis system may track wear associated with 100 vehicle components of a vehicle and may generate an average wear metric for the vehicle by computing an average of the 100 component wear metrics. In various embodiments, the vehicle data analysis system ranks the vehicles based on the average wear metric. Additionally or alternatively, the vehicle data analysis system may rank the vehicles based on individual component wear metrics.

In some embodiments, step 318 includes ranking drivers. For example, the vehicle data analysis system may correlate vehicle wear with a driving pattern, may determine what portion of vehicle wear each driver is responsible for (e.g., based on each driver's driving pattern), and may rank the drivers based on their respective contributions to vehicle wear. In various embodiments, the ranking is used to generate recommendations. For example, the vehicle data analysis system may generate a recommendation to enroll the top ten ranked drivers (e.g., the ten drivers causing the most vehicle wear, etc.) in a driving course. Additionally or alternatively, the ranking (or information associated therewith) may be transmitted to an external system. For example, the ranking may be transmitted to an insurance provider computing system to facilitate determining insurance premiums for each driver. In some embodiments, a high driver score indicates a driver is responsible for a small amount of vehicle wear. Alternatively, a high driver score may indicate a driver is responsible for a large amount of vehicle wear.

Figure 4:
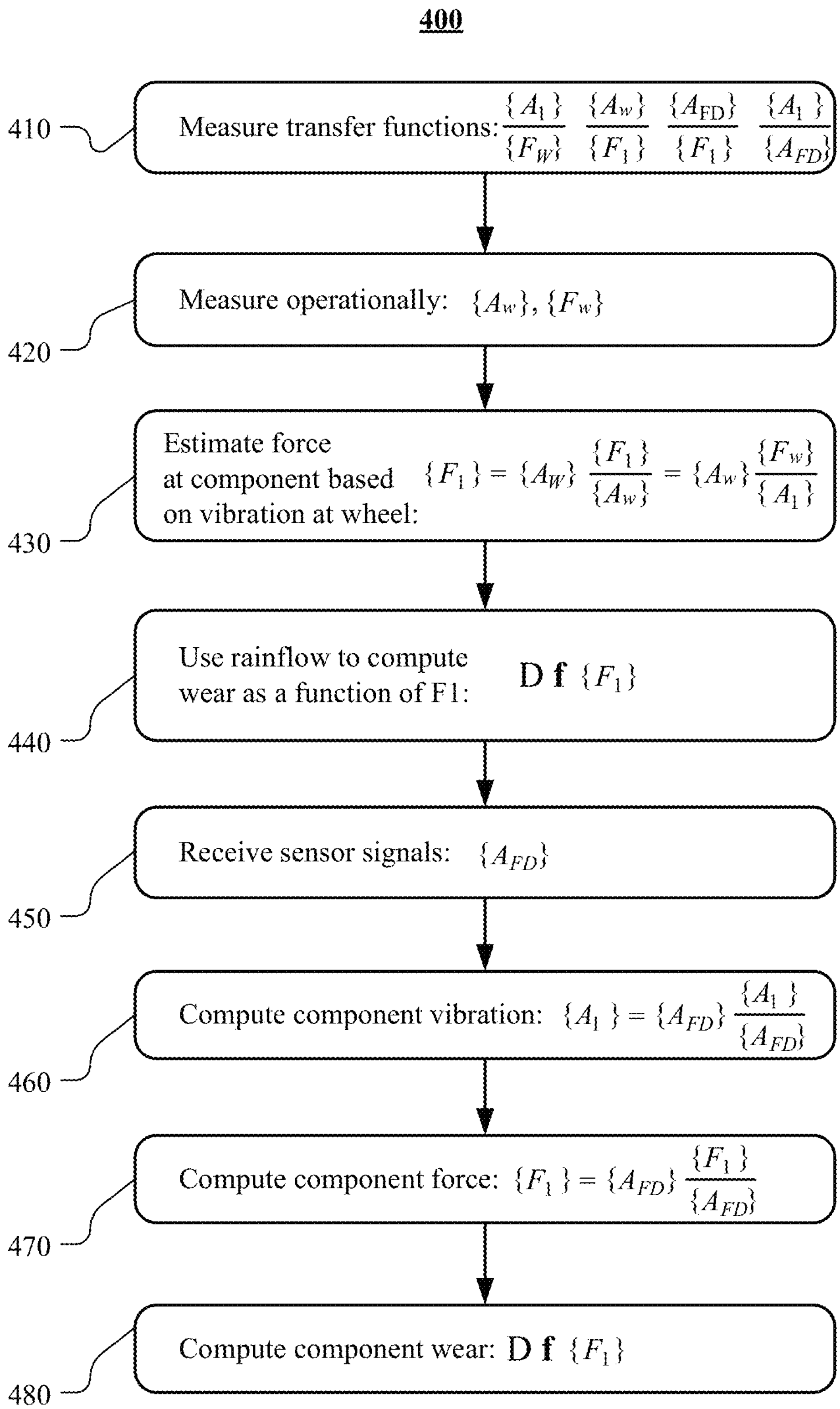
FIG. 4 illustrates a method of computing component wear for a vehicle.

FIG. 4 illustrates a method 400 of computing component wear for a vehicle, according to an exemplary embodiment. Method 400 may be used to perform background monitoring of a component of vehicle 200. A vibration sensor may be coupled to the component. An output of a first vibration sensor may be represented by $\{A_{FD}\}$. An output of a second vibration sensor 406 may be represented by $\{A_W\}$. In some embodiments, a force corresponding to a wheel is calculated based on the output a vibration sensor. The force corresponding to the wheel may be represented by $\{F_W\}$. The vibration sensors may be used to monitor a portion of a component for wear. For example, method 400 may be used to identify a crack at a portion of a component. The force and vibration at the portion of the component may be represented as $\{F_1\}$ and $\{A_1\}$ respectively.

At step 410, one or more transfer functions may be measured. A transfer function may describe a relationship between vibration at a first location (e.g., the location of a first vibration sensor, etc.) and vibration at a second location (e.g., the location of the portion of the component, etc.). However it should be understood that transfer functions representing other relationships are possible. For example, a transfer function may describe a relationship between vibration at a first location and force at a second location. The one or more transfer functions may be represented as:

$$\frac{\{A_1\}}{\{A_W\}}\ \frac{\{A_W\}}{\{F_1\}}\ \frac{\{A_{FD}\}}{\{F_1\}}\ \frac{\{A_1\}}{\{A_{FD}\}}$$

At step 420, an output of a vibration sensor may be measured. In some embodiments, step 420 includes calculating a force at a wheel based on vibration measurements at the wheel. At step 430, an estimate of force at a portion of a component may be estimated based on vibration at the wheel. For example, control system 230 may compute an estimate of force at a portion of a component by applying a transfer function to vibration data from a vibration sensor. In some embodiments, an output of step 430 includes timeseries force data corresponding to force experienced by the portion of the component over time. In various embodiments, step 430 includes implementing the function:

$$\{F_1\} = \{A_W\}\frac{\{F_1\}}{\{A_W\}} = \{A_W\}\frac{\{F_W\}}{\{A_1\}}$$

At step 440, control system 230 may compute wear associated with the portion of the component using the force computed in step 430. In various embodiments, step 440 includes calculating a rainflow matrix based on the force. For example, control system 230 may sum a number of fatigue cycles generated from timeseries force data. In some embodiments, wear is expressed as a percentage of a threshold number of fatigue cycles. In various embodiments, control system 230 performs steps 440-480. At step 450, control system 230 may receive vibration data from a vibration sensor. At step 460, control system 230 may compute component vibration using the vibration data from the vibration sensor. In various embodiments, step 460 includes applying a transfer function to the vibration data from the vibration sensor. For example, control system 230 may implement the function:

$$\{A_1\} = \{A_{FD}\}\frac{\{A_1\}}{\{A_{FD}\}}$$

At step 470, control system 230 may compute component force for the portion of the component using the vibration data from the vibration sensors. In various embodiments, step 470 includes applying a transfer function to the vibration data from a vibration sensor. For example, control system 230 may implement the function:

$$\{F_1\} = \{A_{FD}\}\frac{\{F_1\}}{\{A_{FD}\}}$$

At step 480, control system 230 may compute component wear based on the component force computed in step 470. In various embodiments, step 480 includes calculating a rainflow matrix based on the force. For example, control system 230 may sum a number of fatigue cycles generated from timeseries force data. In some embodiments, wear is expressed as a percentage of a threshold number of fatigue cycles. In some embodiments, step 480 includes combining the measure of wear associated with the portion of the component generated from vibration data from a first vibration sensor with the measure of wear associated with the portion of the component generated from vibration data from a second vibration sensor. For example, control system 230 may compute an average wear using the two measurements of wear. In some embodiments, steps 420-440 are performed in parallel with steps 450-480.

Figure 5:
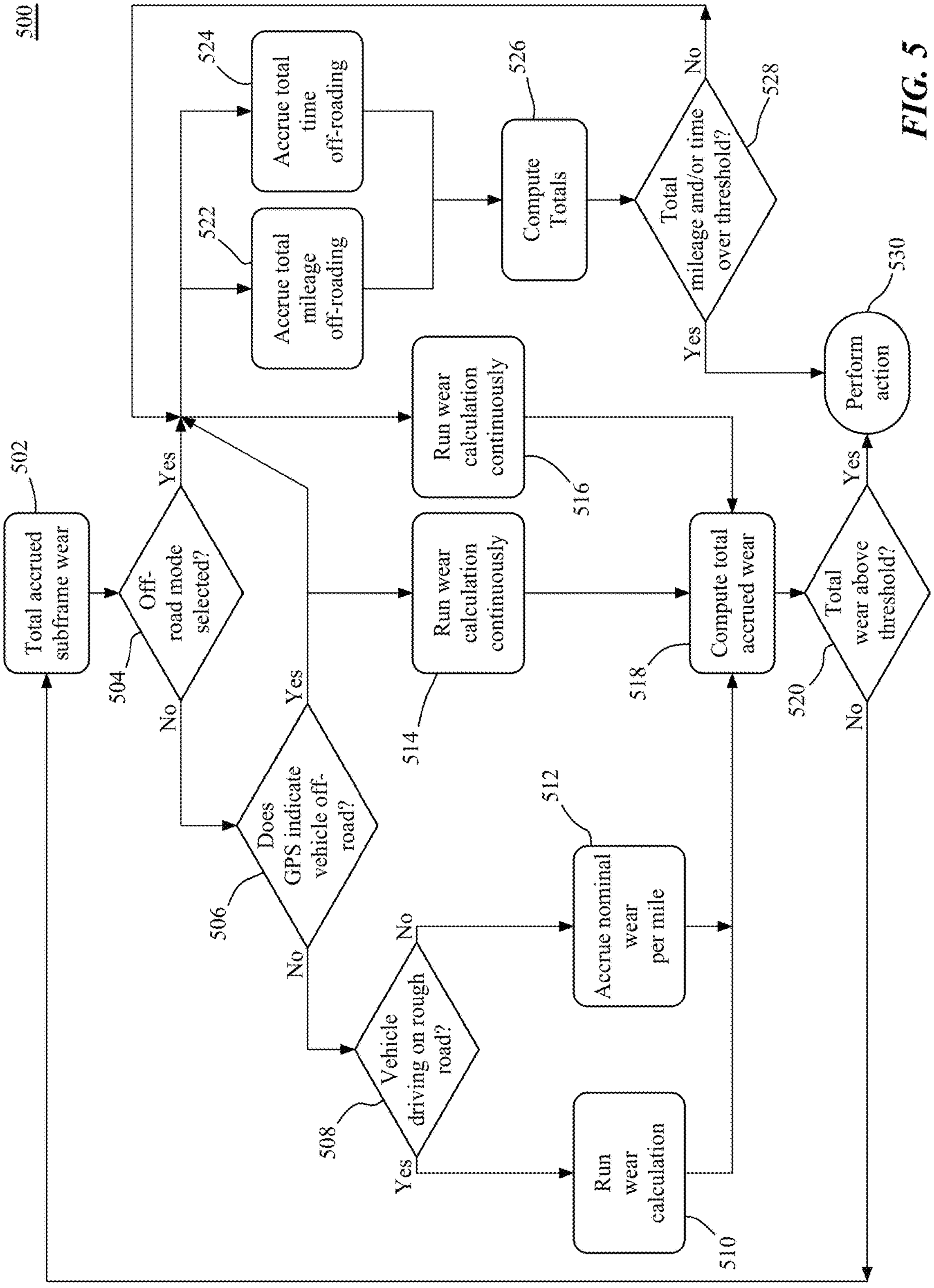
FIG. 5 is a flowchart illustrating a method of monitoring wear for a vehicle.

FIG. 5 is a flowchart illustrating a method 500 of monitoring wear for a vehicle. For example, control system 230 may implement method 500 to continuously monitor wear associated with one or more components of vehicle 200. Starting with the total accrued component wear calculated from the above description, a determination may be made to determine whether the vehicle is currently in an off-road environment. Using the off-road mode of the vehicle as an initial indicator, a vehicle in this mode may result in both a wear calculation and an off-road mileage and time calculation. These accrued totals may then be compared against thresholds representing acceptable threshold values and exceeding either threshold may result in the trigger of a diagnostic trouble code (DTC) to notify the customer of a potential problem and a need for service. On the other hand, if the off-road mode of the vehicle is not enabled, the vehicle's GPS may be utilized to determine the road conditions the vehicle is currently subjected to. Indications of off-road conditions may result in actual wear calculations, whereas only nominal wear calculations are performed otherwise. In both conditions, the computed total wear is subsequently compared against the threshold and may also in turn result in the trigger of a DTC.

At step 504, control system 230 may determine whether an off-road mode is selected. For example, the TCM ECU may query the CGM ECU to determine what mode vehicle 200 is in. If the off-road mode is selected (yes), method 500 may continue with steps 516, 522, and 524. At step 516, control system 230 may run wear calculations continuously. For example, control system 230 may execute a method of monitoring component wear as described in detail above. At step 518, control system 230 may compute total accrued wear based on the wear calculation from step 516. For example, control system 230 may compute a rainflow matrix representing a total number of accrued fatigue cycles associated with a vehicle and/or a vehicle component over its lifetime. At step 520, control system 230 may compare the total accrued wear from step 518 with a threshold. If the total accrued wear is less than the threshold (no), then control system 230 may save the total accrued component wear (step 502). If the total accrued wear is greater than the threshold (yes), then control system 230 may perform an action (step 530). The action may include automatically scheduling a service appointment to service a component determined to have exceeded a threshold level of wear. Additionally or alternatively, the action may include alerting service personnel that the vehicle requires service.

At step 522, control system 230 may accrue total mileage off-roading. For example, control system 230 may update a counter to determine the number of miles driven in the off-road mode. At step 524, control system 230 may accrue total time off-roading. For example, control system 230 may update a timer to determine the total time spent in the off-road mode. At step 526, control system 230 may compute totals. For example, control system 230 may compute a total amount of mileage driven off-road and/or a total amount of time spent off-roading. At step 528, control system 230 may compare the total mileage and/or the total time to a threshold. In some embodiments, control system 230 compares the total mileage to a first threshold and the total time to a second threshold. If the total mileage and/or the total time are greater than a threshold (yes), then control system 230 may perform an action (step 530). For example, control system 230 may alert a user that a service appointment is recommended based on the total number of miles driven off-road. If the total mileage and/or total time are less than a threshold (no), then control system 230 may continue monitoring wear, mileage, and/or time associated with off-roading.

If the off-road mode is not selected (no), method 500 may continue with step 506. At step 506, control system 230 may determine whether GPS data indicates the vehicle is off-road. For example, control system 230 may compare a GPS location of vehicle 200 to a map of known roads to determine whether vehicle 200 is on one of the known roads. If the GPS data indicates that the vehicle is off-road (yes), then control system 230 may perform the off-road monitoring described above (e.g., steps 516, 522, and 524). If the GPS data indicates that the vehicle is not off-road (no), then control system 230 may determine whether the vehicle is driving on a rough road (step 508). For example, control system 230 may compare an amplitude of vibration data signals to a threshold and determine that the vehicle is driving on a rough road if the amplitude of the vibration data signals exceed the threshold a threshold number of times during a period.

If control system 230 determines that the vehicle is driving on a rough road (yes), then control system 230 may run a wear calculation continuously (step 510). Running the wear calculation may include computing a rainflow matrix to determine an aggregate number of fatigue cycles based on vibration data as described in detail above. If control system 230 determines that the vehicle is not driving on a rough road (no), then the control system may accrue nominal wear per mile (step 512). For example, control system 230 may add a scalar value to a rainflow matrix for each mile traveled by the vehicle. In various embodiments, control system 230 performs step 518 after steps 510 and 512.

In some embodiments, assessments of wear as described herein may be directed to vehicle control systems, methods, and computer readable mediums for monitoring surface characteristics and assessing driving routes to mitigate wear on a vehicle. The systems and methods of the present disclosure can monitor a surface, such as a road surface, to identify surface characteristic (e.g., road texture, potholes, cracks, bumps, curbs, speed bumps, etc.) based on sensor signals from sensors built into specific locations on the vehicle and can generate/assess driving routes to mitigate wear on vehicle components based on the identified surface characteristics, thereby reducing wear on vehicle components, vehicle downtime, and maintenance costs. Further description related to such embodiments is disclosed in U.S. Nonprovisional application Ser. No. 17/960,088, filed Oct. 4, 2022, titled "Wear Mitigation Routing Platform", which is incorporated herein by reference.

Figure 6:
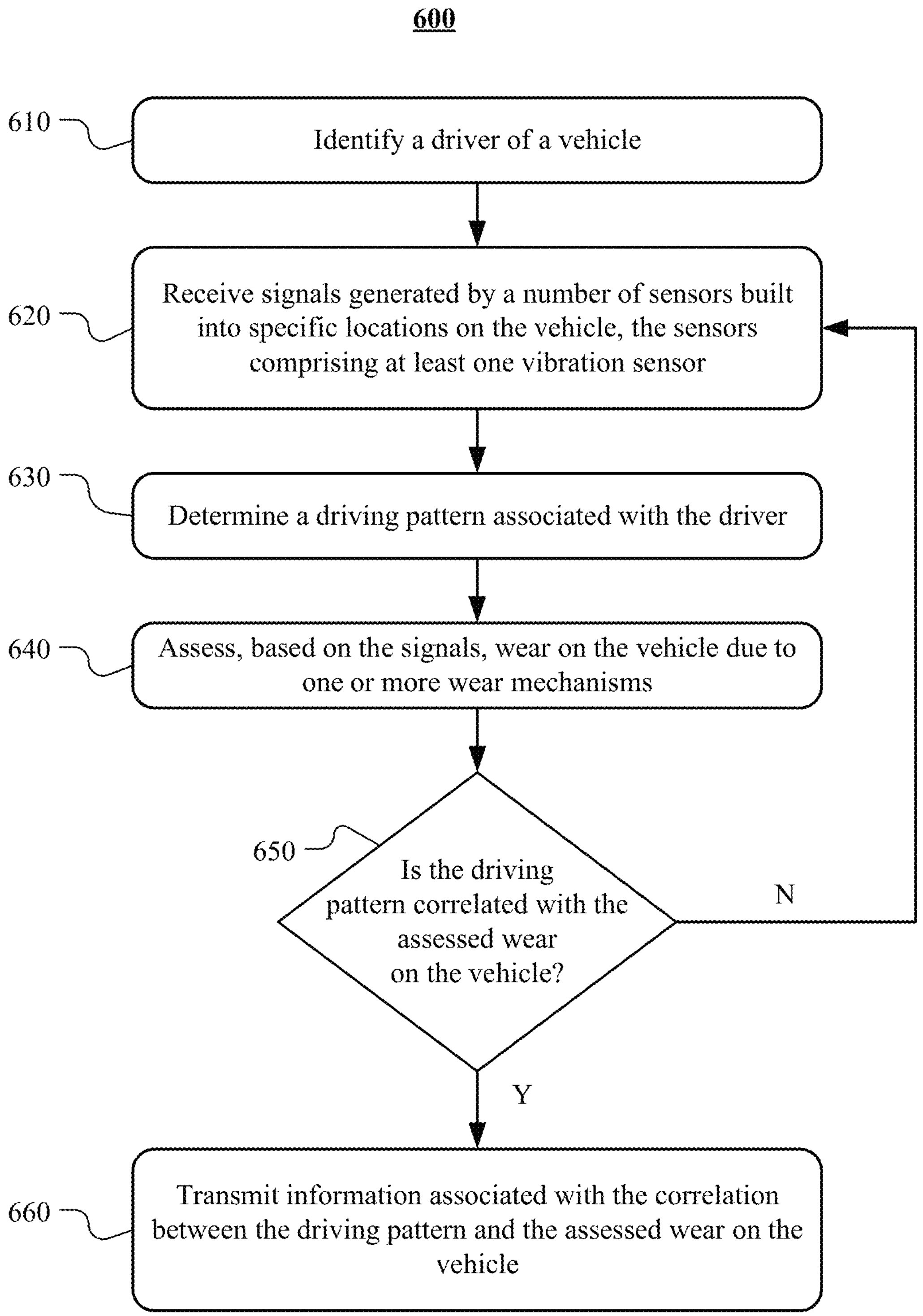
FIG. 6 is a flowchart illustrating a method of correlating driving behavior to wear on a vehicle.

Turning now to FIG. 6, a flowchart illustrating method 600 for correlating driver behavior to wear is shown, according to an exemplary embodiment. In various embodiments, a cloud-based data processing system executes method 600. Additionally or alternatively, an on-board module of vehicle 200 may execute method 600. In brief, method 600 may facilitate generating a model by correlating (i) a library of previously collected sensor signals corresponding to vehicle wear and driver behavior with (ii) various outcomes such as accelerated vehicle/vehicle component wear, unplanned downtime, and/or an accident. The model may be used to correlate specific driver characteristics/metrics with outcomes such as vehicle wear. For example, a cloud-based data processing system may determine that a driver tends to corner in a manner that causes accelerated tire wear to tires of a vehicle and may generate a recommendation to adjust how they corner to reduce future tire wear. Method 600 is described in relation to a cloud-based data processing system; however it should be understood that any processing system (e.g., an on-board module of vehicle 200, etc.) may perform method 600.

At step 610, the cloud-based data processing system may identify a driver of a vehicle. For example, the cloud-based data processing system may receive a weight measurement from a seat of vehicle 200 and perform a lookup using the weight to identify a driver profile corresponding to a driver based on the weight. As another example, the cloud-based data processing system may receive a notification from vehicle 200 identifying the driver based on a key the driver used to start the vehicle (e.g., where each key is linked to a specific driver, etc.). As another example, vehicle 200 may identify the driver using a biometric identifier (e.g., facial recognition, voice recognition, etc.) and may transmit an indication of the driver to the cloud-based data processing system. In some embodiments, step 610 includes receiving an input from a driver. For example, a driver may enter login credentials into user interface (UI) of vehicle 200 and vehicle 200 may transmit an indication of the driver to the cloud-based data processing system based on the login credentials.

At step 620, the cloud-based data processing system may receive signals generated by a number of sensors built into specific locations on the vehicle. For example, the cloud-based data processing system may receive vibration data associated with component vibrations caused by traversing a road surface and may receive image data of a tire of a vehicle. In various embodiments, the cloud-based data processing system receives data describing a driver's operation of a vehicle. For example, the cloud-based data processing system may receive data describing a brake/throttle position, a relative position of the vehicle (e.g., relative to other vehicles, relative to a lane the vehicle is driving in, etc.), a steering angle, and/or force acting on the vehicle (e.g., a roll moment of the vehicle, a measure of frame torsion, etc.). In various embodiments, the sensors include at least one vibration sensor (e.g., a tri-axial accelerometer, etc.). In various embodiments, step 620 includes storing the signals in a data structure. For example, the cloud-based data processing system may store the signals in a ledger associated with the driver.

At step 630, the cloud-based data processing system may determine a driving pattern associated with the driver. For example, the cloud-based data processing system may calculate a number of driver characteristics/metrics based on the signals and may combine the number of driver characteristics/metrics into a driving pattern. In various embodiments, step 630 includes analyzing the signals using a model. For example, the cloud-based data processing system may input data describing a driver's operation of the vehicle into a CNN autoencoder to label one or more driving events (e.g., hard cornering events/normal cornering events, rapid steering events/non-rapid steering events, hard braking events/normal braking events, etc.) in the data. In various embodiments, step 630 includes labeling timeseries data. For example, the cloud-based data processing system may train a model using previously collected steering angle data labeled to identify rapid steering events and may apply the model to timeseries steering angle data associated with a driver to label rapid steering events in the timeseries steering angle data. The cloud-based data processing system may analyze the labeled timeseries data to generate the number of driver characteristic/metrics. For example, the cloud-based data processing system may calculate an average stopping distance based on labeled vehicle speed data and may combine the average stopping distance with a number of other driver characteristics/metrics to generate a driving pattern for the driver. In various embodiments, the driver characteristics/metrics include a stopping distance, a following distance, a position in lane, a ratio of actual speed to a threshold, a frequency of lane changes, a frequency of rapid acceleration, and/or a frequency of rapid deceleration.

At step 640, the cloud-based data processing system may assess wear on the vehicle based on the signals. For example, the cloud-based data processing system may apply a transfer function to vibration data to generate a measure of stress at a strut of vehicle 200 and may compute a rainflow matrix using the measure of stress to generate a measure of stress-based wear for the strut. As another example, the cloud-based data processing system may perform image analysis to determine a tread depth of a tire of vehicle 200 and may compare the tread depth to a previously determined tread depth to determine a measure of tire wear. In some embodiments, step 640 includes determining a measure of component-level wear for the vehicle. Additionally or alternatively, step 640 may include determining a measure of vehicle wear (e.g., by aggregating component-level wear associated with the vehicle, etc.). In some embodiments, step 640 includes performing frequency analysis based on the signals. For example, an on-board module may compute a Fast Fourier Transform (FFT) from vibration data and may apply a peak-picking filter to identify a frequency associated with a specific component failure state and may link the component failure state with a measure of component wear. Additionally or alternatively, step 640 may include determining a measure of a remaining life of each component (e.g., % of life remaining, etc.). In various embodiments, assessing wear includes identifying changes in a rate of vehicle/vehicle component wear. For example, the cloud-based data processing system may track accumulated component wear over time and may identify an acceleration in a rate of wear associated with the component.

At step 650, the cloud-based data processing system may determine whether the driving pattern is correlated with the assessed wear on the vehicle. For example, the cloud-based data processing system may apply a ML model trained using driving patterns generated based on previously collected signals from a number of vehicles and assessed wear associated with the number of vehicles. In some embodiments, step 650 includes comparing a metric describing a correlation between the driving pattern and the assessed wear on the vehicle to a threshold. For example, the cloud-based data processing system may compare a $R^2$ value to a threshold to determine whether a driver's behavior is strongly correlated with vehicle wear. In some embodiments, the cloud-based data processing system determines whether the driving pattern is correlated with component-level wear. Additionally or alternatively, the cloud-based data processing system may determine whether the driving pattern is correlated with aggregate vehicle wear (e.g., by aggregating a number of component-level correlations, etc.). In various embodiments, step 650 includes computing a score associated with the driver. For example, the cloud-based data processing system may compare (i) a correlation between the driving pattern associated with the driver and the assessed wear on the vehicle and (ii) a correlation between driving patterns associated with other drivers and assessed wear on their respective vehicles. In various embodiments, step 650 includes determining one or more weights associated with parameters of an objective function. For example, the cloud-based data processing system may apply an objective function to generate a driver score and may determine a number of parameters weights associated with the objective function based on the correlation between specific driver characteristics/metrics of the driving pattern and vehicle wear. If the cloud-based data processing system determines that the driving pattern is not correlated with the assessed vehicle wear (no), then method 600 may proceed with step 620. For example, the cloud-based data processing system may continuously monitor driver behavior until it determines that driver behavior is correlated with an outcome such as vehicle wear. If the cloud-based data processing system determines that the driving pattern is correlated with the assessed vehicle wear (yes), then method 600 may proceed with step 660.

At step 660, the cloud-based data processing system may transmit information associated with the correlation between the driving pattern and the assessed wear on the vehicle. For example, the cloud-based data processing system may transmit a driver score to an insurance provider computing system to facilitate determining an insurance premium. As another example, the cloud-based data processing system may transmit an accident reconstruction describing driver characteristics/metrics determined to be correlated with an accident that occurred. In some embodiments, step 660 includes transmitting a driver ranking comparing a driver score of the driver to other driver scores associated with other drivers.

In some embodiments, step 660 includes generating one or more recommendations based on the correlation. For example, the cloud-based data processing system may compare a first objective function associated with the driver to a number of objective functions associated with other drivers to determine that a weight associated with a parameter of the first objective function is significantly greater than a weight of the parameter for the corresponding number of objective functions, and may generate a recommendation for the driver to adjust their behavior (e.g., drive more slowly, etc.) based on the comparison. In some embodiments, step 660 includes transmitting a report. For example, the cloud-based data processing system may transmit a report to a fleet management system that includes a ranking (e.g., based on a driver score for each driver) for each driver in a fleet. Additionally or alternatively, step 660 may include transmitting a recommendation or warning to a driver. For example, the cloud-based data processing system may determine that a rapid acceleration by a driver is causing accelerated bushing wear on a drive unit of a vehicle and may transmit a recommendation to the user to accelerate more slowly and/or a warning that the driver's behavior is causing wear on the vehicle. In some embodiments, step 660 includes controlling an operation of the vehicle. To continue the previous example, an on-board module may adjust driver-controlled vehicle operations (e.g., by adjusting acceleration controls to reduce a rate of acceleration, by adjusting brake controls to brake more smoothly or initiate a braking operation automatically in response to traffic conditions, or by adjusting a vehicle suspension to a greater height) in response to determining that the manner in which the driver is controlling the vehicle operation is causing accelerated bushing wear, thereby decreasing continued wear on the bushing. In particular embodiments, the adjustment to the driver-controlled vehicle operation may be initiated by a third-party supervisor (e.g., fleet manager, vehicle owner, or parent).

Figure 7:
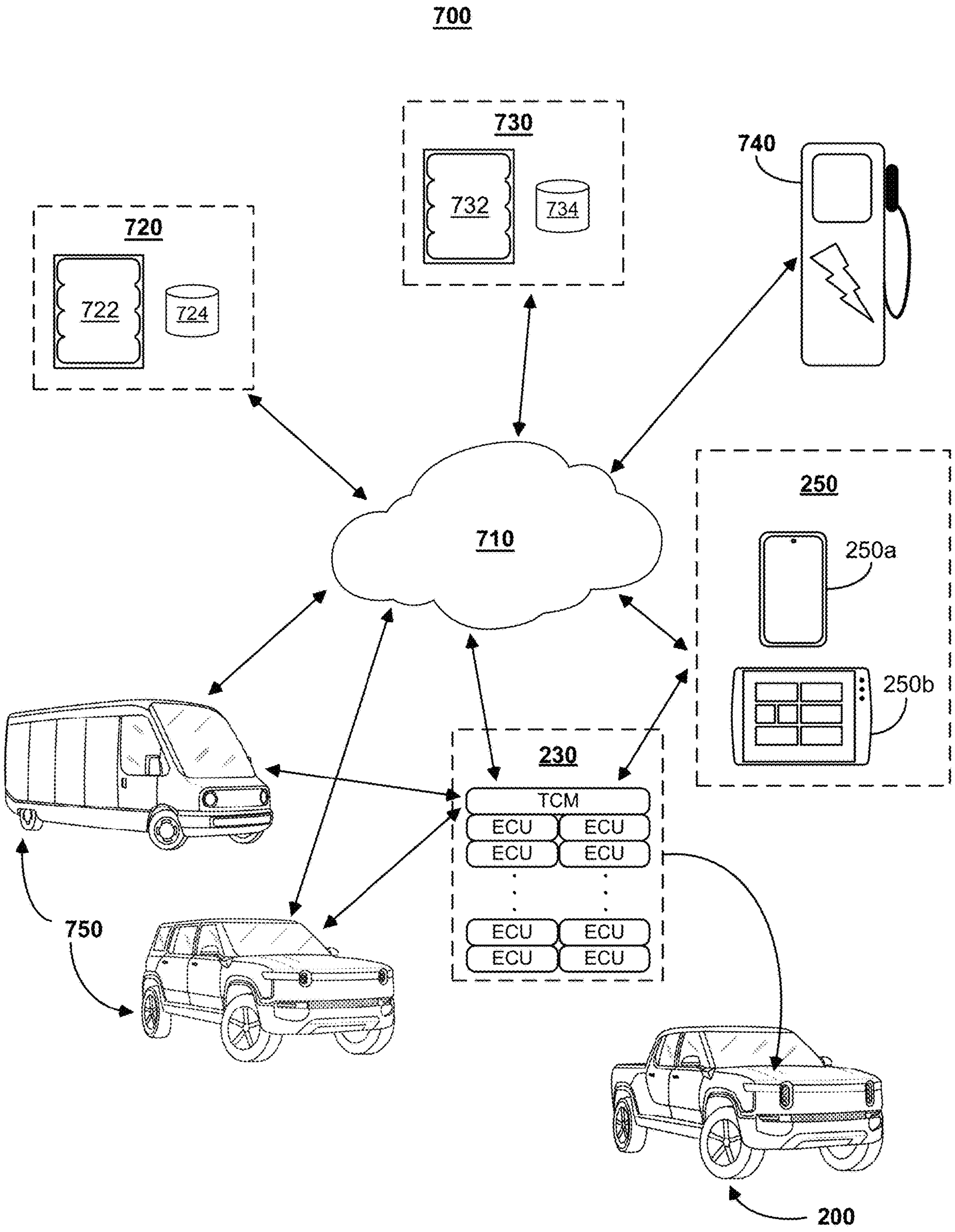
FIG. 7 illustrates an example network system including a connected vehicle.

FIG. 7 illustrates an example networked environment 700. Computer system 700 may include a connected vehicle 200 with a control system 230 that is capable of transmitting data to/from a network 710. Network 710 may also be connected to one or more computing servers 720 (e.g., including compute units 722 and storage units 724) associated with a vehicle manufacturer, a vehicle service provider, a vehicle fleet operator, or a vehicle-charging facility provider. Network 710 may also be connected to one or more third-party computing servers 730 (e.g., including compute units 732 and storage units 734) associated with, for example, a smart accessory manufacturer, a group event organizer, service provider, or a governmental organization. Networked environment 700 may include one or more landscape features 740 (e.g., automated toll road sensors, smart road signs or road markers, automated toll gates, power dispensers at charging stations). Networked environment 700 may also include other connected vehicles 750 that may be capable of communicating with vehicle 200 through network 710 and/or directly with vehicle 200 (e.g., by communicating with a TCM ECU of a control system 230 of vehicle 200 when connected vehicle 750 is within range of a short-range communications network, such as Bluetooth). Networked environment 700 may also include one or more computing devices 250 (e.g., smartphone 250*a*, a tablet computing device 250*b*, or a smart vehicle accessory) capable of communicating with network 710 and/or directly with vehicle 200.

Networked environment 700 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 200 to deduct a toll from a specified account and provides confirmation of the transaction). In particular embodiments, one or more elements of networked environment 700 may include one or more computer systems, as described in further detail with respect to FIG. 8A. In particular embodiments, one or more elements of networked environment 700 perform one or more steps of one or more methods described or illustrated herein. In particular embodiments, software running on one or more elements of networked environment 700 may be controlled by a single entity to perform one or more steps of one or more methods described or illustrated herein or provide functionality described or illustrated herein.

Figure 8A:
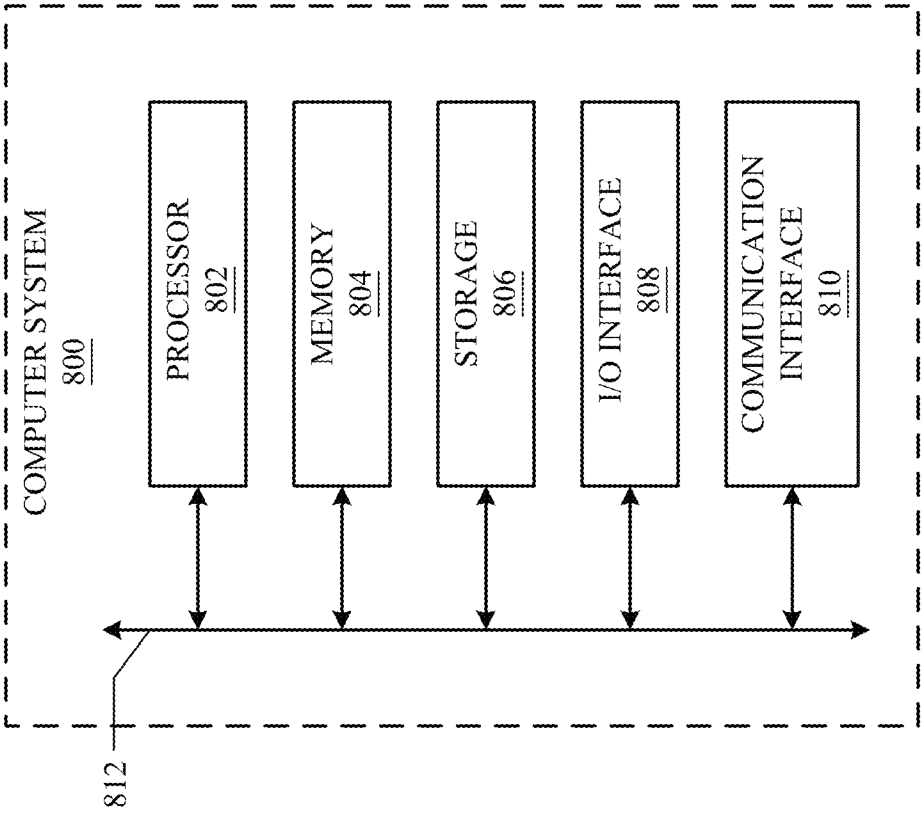
FIG. 8A is a schematic of an example computer system.

FIG. 8A illustrates an example computer system 800. Computer system 800 may include a processor 802, memory 804, storage 806, an input/output (I/O) interface 808, a communication interface 810, and a bus 812. Although this disclosure describes one example computer system including specified components in a particular arrangement, this disclosure contemplates any suitable computer system with any suitable number of any suitable components in any suitable arrangement. As an example and not by way of limitation, computer system 800 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 800 may include one or more computer systems 800; be unitary or distributed, span multiple locations, machines, or data centers; or reside in a cloud, which may include one or more cloud components in one or more networks. Where appropriate, computer system(s) 800 may perform, at different times or at different locations, in real time or in batch mode, one or more steps of one or more methods described or illustrated herein.

Processor 802 (e.g., compute units 722 and 732) may include hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806 (e.g., storage units 724 and 734). Processor 802 may include one or more internal caches for data, instructions, or addresses.

In particular embodiments, memory 804 includes main memory for storing instructions for processor 802 to execute or data for processor 802 to operate on. In particular embodiments, one or more memory management units (MMUs) reside between processor 802 and memory 804 and facilitate accesses to memory 804 requested by processor 802. In particular embodiments, memory 804 includes random access memory (RAM). This disclosure contemplates any suitable RAM.

In particular embodiments, storage 806 includes mass storage for data or instructions. As an example and not by way of limitation, storage 806 may include a removable disk drive, flash memory, an optical disc, a magneto-optical disc, magnetic tape, or a Universal Serial Bus (USB) drive or two or more of these. Storage 806 may include removable or fixed media and may be internal or external to computer system 800. Storage 806 may include any suitable form of non-volatile, solid-state memory or read-only memory (ROM).

In particular embodiments, I/O interface 808 includes hardware, software, or both, providing one or more interfaces for communication between computer system 800 and one or more input and/or output (I/O) devices. Computer system 800 may be communicably connected to one or more of these I/O devices, which may be incorporated into, plugged into, paired with, or otherwise communicably connected to vehicle 200 (e.g., through the TCM ECU). An input device may include any suitable device for converting volitional user input into digital signals that can be processed by computer system 800, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 210 described above. An output device may include devices designed to receive digital signals from computer system 800 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 808 for them. I/O interface 808 may include one or more I/O interfaces 808, where appropriate.

In particular embodiments, communication interface 810 includes hardware, software, or both providing one or more interfaces for data communication between computer system 800 and one or more other computer systems 800 or one or more networks. Communication interface 810 may include one or more interfaces to a controller area network (CAN) or to a local interconnect network (LIN). Communication interface 810 may include one or more of a serial peripheral interface (SPI) or an isolated serial peripheral interface (isoSPI). In some embodiments, communication interface 810 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 812 includes hardware, software, or both coupling components of computer system 800 to each other. Bus 812 may include any suitable bus, as well as one or more buses 812, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

Figure 8B:
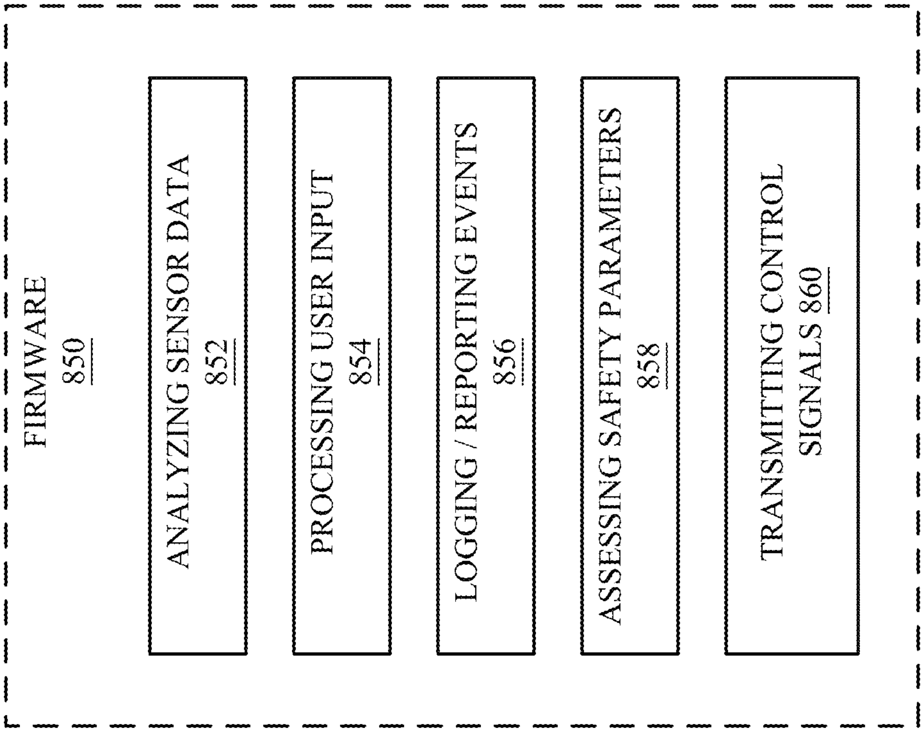
FIG. 8B illustrates example firmware for a vehicle ECU.

FIG. 8B illustrates example firmware 850 for a vehicle ECU 800 as described with respect to control system 230. Firmware 850 may include functions 852 for analyzing sensor data based on signals received from sensors 210 or cameras 220 received through communication interface 810. Firmware 850 may include functions 854 for processing user input (e.g., directly provided by a driver of or passenger in vehicle 200 or provided through a computing device 250) received through I/O interface 808. Firmware 850 may include functions 856 for logging detected events (which may be stored in storage 806 or uploaded to the cloud), as well as functions for reporting detected events (e.g., to a driver or passenger of the vehicle through an instrument display or interactive interface of the vehicle, or to a vehicle manufacturer, service provider, or third party through communication interface 810). Firmware 850 may include functions 858 for assessing safety parameters (e.g., monitoring the temperature of a vehicle battery or the distance between vehicle 200 and nearby vehicles). Firmware 850 may include functions 860 for transmitting control signals to components of vehicle 200, including other vehicle ECUs 800.

Particular embodiments may repeat one or more steps of the methods of FIGS. 3, 4, 5, and/or 6, where appropriate. Although this disclosure describes and illustrates particular steps of the methods of FIGS. 3, 4, 5, and/or 6 as occurring in a particular order, this disclosure contemplates any suitable steps of the methods of FIGS. 3, 4, 5, and/or 6 occurring in any suitable order. Moreover, although this disclosure describes and illustrates example methods for (i) computing wear for a vehicle and ranking a number of vehicles, (ii) computing component wear, (iii) monitoring wear for a vehicle, and (iv) correlating driving behavior to wear on a vehicle including the particular steps of the methods of FIGS. 3, 4, 5, and/or 6, this disclosure contemplates any suitable method for the methods described above including any suitable steps, which may include all, some, or none of the steps of the methods of FIGS. 3, 4, 5, and/or 6, where appropriate. Furthermore, although this disclosure describes and illustrates particular components, devices, or systems carrying out particular steps of the methods of FIGS. 3, 4, 5, and/or 6, this disclosure contemplates any suitable combination of any suitable components, devices, or systems carrying out any suitable steps of the methods of FIGS. 3, 4, 5, and/or 6.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for correlating driving behavior to wear on a vehicle, the method comprising:

identifying, by a control module of the vehicle, a driver of the vehicle;

receiving, by the control module of the vehicle, signals generated by a plurality of sensors built into specific locations on the vehicle, the sensors comprising at least one vibration sensor;

determining, by the control module of the vehicle based on the signals, a driving pattern associated with the driver;

assessing, by the control module of the vehicle based on the signals, wear on the vehicle due to one or more wear mechanisms;

determining, by the control module of the vehicle, whether the driving pattern is a cause of the assessed wear on the vehicle;

operating, with the control module of the vehicle and responsive to a determination by the control module that the driving pattern is the cause of the assessed wear on the vehicle, a telecommunications module of the vehicle to transmit, to a vehicle data analysis system, information associated with the driving pattern being the cause of the assessed wear on the vehicle;

determining, by the control module of the vehicle based on the signals, an additional driving pattern associated with the driver;

assessing, by the control module of the vehicle based on the signals, additional wear on the vehicle due to the one or more wear mechanisms;

determining, by the control module of the vehicle, that the additional driving pattern is not a cause of the assessed additional wear on the vehicle; and refraining, responsive to determining by the control module of the vehicle that the additional driving pattern is not the cause of the assessed additional wear on the vehicle, from transmitting additional information associated with the additional driving pattern being the cause of the assessed additional wear on the vehicle.

2. The method of claim 1, wherein the signals comprise at least one of: (i) brake data describing a position of a brake of the vehicle, (ii) accelerator data describing a position of an accelerator of the vehicle, or (iii) steering data describing a steering angle of the vehicle.

3. The method of claim 1, wherein determining the driving pattern comprises generating a metric describing a driving characteristic of the driver.

4. The method of claim 3, wherein the driving characteristic comprises at least one of: (i) a stopping distance, (ii) a following distance, (iii) a position in lane, (iv) a ratio of actual speed to a threshold, (v) a frequency of lane changes, (vi) a frequency of rapid acceleration, or (vii) a frequency of rapid deceleration.

5. The method of claim 3, wherein determining the driving pattern comprises generating an objective function that represents a contribution of the driving characteristic to the assessed wear and comprises the metric.

6. The method of claim 3, wherein determining whether the driving pattern is the cause of the assessed wear comprises determining a contribution of the driving characteristic to the assessed wear.

7. The method of claim 6, wherein determining the contribution of the driving characteristic to the assessed wear comprises determining a weight associated with the metric in an objective function that represents the contribution of the driving characteristic to the assessed wear.

8. The method of claim 6, wherein the information associated with the driving pattern being the cause of the assessed wear comprises a report associated with the driving characteristic based on the contribution.

9. The method of claim 1, wherein assessing wear on the vehicle comprises at least one of (i) applying a machine learning (ML) model trained to predict component wear to at least a first portion of the signals, (ii) applying a transfer function to at least a second portion of the signals, or (iii) generating a frequency domain representation of at least a third portion of the signals.

10. A vehicle, comprising:

a plurality of sensors built into specific locations on the vehicle, the plurality of sensors comprising at least one vibration sensor;

a display;

a communication interface; and one or more computing devices, comprising:

one or more non-transitory computer-readable storage media including instructions; and one or more processors coupled to the one or more non-transitory computer-readable storage media, the one or more processors configured to execute the instructions to:

identify a driver of the vehicle;

receive signals generated by the plurality of sensors;

determine, based on the signals, a driving pattern associated with the driver;

assess, based on the signals, wear on the vehicle due to one or more wear mechanisms;

determine whether the driving pattern is a cause of the assessed wear on the vehicle;

control, responsive to a determination that the driving pattern is the cause of the assessed wear on the vehicle, the communication interface to transmit, to a vehicle data analysis system, information associated with the driving pattern being the cause of the assessed wear on the vehicle;

determine, based on the signals, an additional driving pattern associated with the driver;

assess, based on the signals, additional wear on the vehicle due to the one or more wear mechanisms;

determine that the additional driving pattern is not a cause of the assessed additional wear on the vehicle; and refrain, responsive to the determination that the additional driving pattern is not the cause of the assessed additional wear on the vehicle, from transmitting additional information associated with the additional driving pattern being the cause of the assessed additional wear on the vehicle.

11. The vehicle of claim 10, wherein the signals comprise at least one of: (i) brake data describing a position of a brake of the vehicle, (ii) accelerator data describing a position of an accelerator of the vehicle, or (iii) steering data describing a steering angle of the vehicle.

12. The vehicle of claim 10, wherein determining the driving pattern comprises generating a metric describing a driving characteristic of the driver.

13. The vehicle of claim 12, wherein the driving characteristic comprises at least one of: (i) a stopping distance, (ii) a following distance, (iii) a position in lane, (iv) a speed, (v) a frequency of lane changes, (vi) a frequency of rapid acceleration, or (vii) a frequency of rapid deceleration.

14. The vehicle of claim 12, wherein determining the driving pattern comprises generating an objective function that represents a contribution of the driving characteristic to the assessed wear and comprises the metric.

15. The vehicle of claim 12, wherein determining whether the driving pattern is the cause of the assessed wear comprises determining a contribution of the driving characteristic to the assessed wear.

16. The vehicle of claim 15, wherein determining the contribution of the driving characteristic to the assessed wear comprises determining a weight associated with the metric in an objective function that represents the contribution of the driving characteristic to the assessed wear.

17. The vehicle of claim 15, wherein the information associated with the driving pattern being the cause of the assessed wear comprises a report associated with the driving characteristic based on the contribution.

18. The vehicle of claim 10, wherein assessing wear on the vehicle comprises at least one of: (i) applying a machine learning (ML) model trained to predict component wear to at least a first portion of the signals, (ii) applying a transfer function to at least a second portion of the signals, or (iii) generating a frequency domain representation of at least a third portion of the signals.

19. A non-transitory computer-readable medium comprising instructions that, when executed by one or more processors of one or more computing devices, cause the one or more processors to:

identify, by an electronic control unit of a vehicle, a driver of the vehicle;

receive, by the electronic control unit of the vehicle, signals generated by a plurality of sensors built into specific locations on the vehicle, the sensors comprising at least one vibration sensor;

determine, by the electronic control unit of the vehicle and based on the signals, a driving pattern associated with the driver;

assess, by the electronic control unit of the vehicle and based on the signals, wear on the vehicle due to one or more wear mechanisms;

determine, by the electronic control unit of the vehicle, whether the driving pattern is the cause of the assessed wear on the vehicle;

control, by the electronic control unit of the vehicle and responsive to a determination by the electronic control unit that the driving pattern is the cause of the assessed wear on the vehicle, a telecommunications module of the vehicle to transmit, to a vehicle data analysis system, information associated with the driving pattern being the cause of the assessed wear on the vehicle;

determine, by the electronic control unit of the vehicle and based on the signals, an additional driving pattern associated with the driver;

assess, by the electronic control unit of the vehicle and based on the signals, additional wear on the vehicle due to the one or more wear mechanisms;

determine, by the electronic control unit of the vehicle, that the additional driving pattern is not a cause of the assessed additional wear on the vehicle; and refrain, responsive to the determination that the additional driving pattern is not the cause of the assessed additional wear on the vehicle, from transmitting additional information associated with the additional driving pattern being the cause of the assessed additional wear on the vehicle.

20. The non-transitory computer-readable medium of claim 19, wherein the information comprises a ranking associated with the driver, the ranking describing a driving characteristic of the driver in comparison with driving characteristics of other drivers.

* * * * *